US012684458B2

(12) United States Patent
Jiang et al.

(10) Patent No.: US 12,684,458 B2
(45) Date of Patent: Jul. 14, 2026

(54) SYSTEM INFORMATION RECEPTION METHOD AND APPARATUS

(71) Applicant: 1FINITY Inc., Kawasaki (JP)

(72) Inventors: Qinyan Jiang, Beijing (CN); Meiyi Jia, Beijing (CN)

(73) Assignee: 1FINITY Inc., Kawasaki (JP)

( * ) Notice: Subject to any disclaimer, the term of this patent is extended or adjusted under 35 U.S.C. 154(b) by 840 days.

(21) Appl. No.: 17/957,276

(22) Filed: Sep. 30, 2022

(65) Prior Publication Data

US 2023/0071890 A1 Mar. 9, 2023

Related U.S. Application Data

(63) Continuation of application No. PCT/CN2020/084301, filed on Apr. 10, 2020.

(51) Int. Cl.
*H04W 48/10* (2009.01)
*H04L 5/00* (2006.01)
(Continued)

(52) U.S. Cl.
CPC ........... *H04W 48/08* (2013.01); *H04L 5/0053* (2013.01); *H04W 16/14* (2013.01); *H04W 72/23* (2023.01)

(58) Field of Classification Search
CPC ... H04W 16/14; H04W 56/001; H04W 48/10; H04W 48/20; H04L 5/0094; H04L 27/26025
See application file for complete search history.

(56) References Cited

U.S. PATENT DOCUMENTS

2018/0167946 A1 6/2018 Si et al.
2018/0279135 A1 9/2018 Hwang et al.
(Continued)

FOREIGN PATENT DOCUMENTS

CN 109716693 A 5/2019
CN 110011714 A 7/2019
(Continued)

OTHER PUBLICATIONS

3GPP TSG RAN WG1 meeting#94bis, R1-1811445 Title: Discussing on UL inter UE Tx prioritizion/multiplexing (Year: 2018).*
(Continued)

*Primary Examiner* — Christopher M Crutchfield
*Assistant Examiner* — Abusayeed M Haque
(74) *Attorney, Agent, or Firm* — Myers Wolin, LLC

(57) ABSTRACT

A system information reception method and apparatus. The method includes a terminal equipment receives a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{q}+5}$ in a physical broadcast channel payload contained in the first synchronization signal block being used for indicating a QCL relationship between SSBs or being not used for indicating a first parameter; the terminal equipment determines the first parameter ($k_{SSB}$) according to the first synchronization signal block; and receives SIB1, associated with the first synchronization signal block, or a second synchronization signal block according to the first parameter.

20 Claims, 15 Drawing Sheets

(51) Int. Cl.

| | | |
|---|---|---|
| *H04L 27/26* | (2006.01) | |
| *H04W 16/14* | (2009.01) | |
| *H04W 48/08* | (2009.01) | |
| *H04W 56/00* | (2009.01) | |
| *H04W 72/23* | (2023.01) | |

(56) References Cited

U.S. PATENT DOCUMENTS

| | | | | |
|---|---|---|---|---|
| 2018/0359149 | A1 | 12/2018 | Shaheen | |
| 2019/0058517 | A1* | 2/2019 | Kang | H04B 7/0695 |
| 2019/0140776 | A1 | 5/2019 | Seo et al. | |
| 2019/0150121 | A1 | 5/2019 | Abdoli et al. | |
| 2019/0215706 | A1* | 7/2019 | Tsai | H04W 74/0833 |
| 2019/0352755 | A1 | 11/2019 | Skrlec et al. | |
| 2021/0068085 | A1 | 3/2021 | Chen | |
| 2024/0406742 | A1* | 12/2024 | Montalvo | G06N 5/04 |
| 2024/0406745 | A1* | 12/2024 | Narula | H04W 52/243 |
| 2024/0406942 | A1* | 12/2024 | Hafeez | H04W 16/14 |
| 2024/0406943 | A1* | 12/2024 | Yadav | H04W 16/14 |

FOREIGN PATENT DOCUMENTS

| | | | |
|---|---|---|---|
| CN | 110382723 | A | 10/2019 |
| CN | 110383723 | A | 10/2019 |
| CN | 110445588 | A | 11/2019 |
| WO | 2019/045514 | A1 | 3/2019 |
| WO | 2020/065862 | A1 | 4/2020 |

OTHER PUBLICATIONS

3GPP TSG RAN WG1 meeting#94, R1-1809796 Title:Summary of views on CSI reporting v3 (Year: 2018).*

First Notification of Office Action and Search Report issued by the China National Intellectual Property Administration for corresponding Chinese Patent Application No. 202080099046.7, mailed on Jan. 13, 2025, with an English translation.

Nokia et al., "Handling of SIB1 decoding error", Agenda Item: 6.2.3.1, 3GPP TSG-RAN WG2 Meeting #109 electronic, R2-2000403, Elbonia, Feb. 24-Mar. 6, 2020, cited in CNOA.

Notice of Reasons for Refusal issued by the Japan Patent Office for corresponding Japanese Patent Application No. 2022-560429, mailed on Mar. 12, 2024, with an English translation.

3GPP TS 38.211 V16.1.0, 3rd Generation Partnership Project; Technical Specification Group Radio Access Network; NR; Physical channels and modulation (Release 16) Mar. 2020.

The extended European search report with supplementary European search report and the European search opinion issued by the European Patent Office for corresponding European Patent Application No. 20929850.4-1213, mailed on May 15, 2023.

Ericsson, "Signaling of Q for NR-U", Agenda Item: 6.2.3.2, 3GPP TSG-RAN WG2 Meeting #109-e, R2-2000338, Electronic meeting, Feb. 24-Mar. 6, 2020.

Qualcomm Incorporated, "Initial access and mobility procedures for NR unlicensed", Agenda Item: 7.2.2.2.2, 3GPP TSG-RAN WG1 Meeting #98bis, R1-1911098, Chongqing, China, Oct. 14-20, 2019.

International Search Report and Written Opinion of the International Searching Authority issued by the China National Intellectual Property Administration for corresponding International Patent Application No. PCT/CN2020/084301, mailed on Dec. 31, 2020, with a partial English translation.

3GPP TS 38.331 V15.6.0, "3rd Generation Partnership Project; Technical Specification Group Radio Access Network; NR; Radio Resource Control (RRC) protocol specification" (Release 15), Jun. 2019.

Notice of Preliminary Rejection issued by the Korean Intellectual Property Office for corresponding Korean Patent Application No. 10-2022-7035223 mailed on Nov. 29, 2024, with an English translation.

Notice of Reasons for Refusal issued by the Japan Patent Office for corresponding Japanese Patent Application No. 2022-560429, mailed on Oct. 10, 2023, with an English translation.

OPPO, "Enhancements to initial access procedure for NR-U", Agenda Item: 7.2.2.2.2, 3GPP TSG-RAN WG1 #99, R1-1912507, Reno, USA, Nov. 18-22, 2019.

Communication pursuant to Article 94(3) EPC issued by the European Patent Office for corresponding European Patent Application No. 20929850.4, mailed on Mar. 11, 2026.

The First Examination Report issued by the Indian Patent Office for corresponding Indian Patent Application No. 202237055886, mailed on May 26, 2026, with an English translation.

* cited by examiner

<u>100</u>

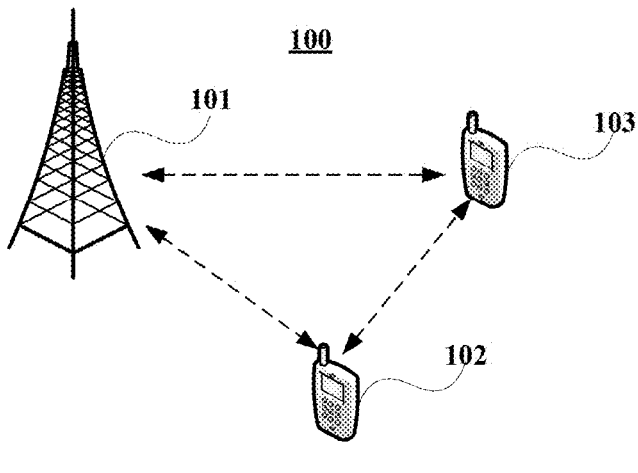

FIG. 1

201 a terminal equipment receives a synchronization signal block (SSB) transmitted by a network device, at least one bit of at least one of indication fields in a physical broadcast channel payload contained in the synchronization signal block being used for indicating a QCL relationship between SSBs

202 the terminal equipment determines whether the physical broadcast channel included in the synchronization signal block indicates the third parameter and/or the value range of the third parameter

203 the terminal equipment determines an indication field for indicating the third parameter according to the value range of the third parameter

FIG. 2 sync raster

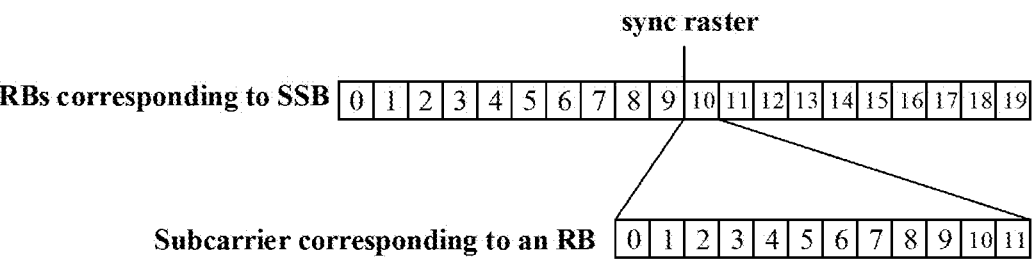

RBs corresponding to SSB | 0 | 1 | 2 | 3 | 4 | 5 | 6 | 7 | 8 | 9 | 10 | 11 | 12 | 13 | 14 | 15 | 16 | 17 | 18 | 19

Subcarrier corresponding to an RB | 0 | 1 | 2 | 3 | 4 | 5 | 6 | 7 | 8 | 9 | 10 | 11

FIG. 3

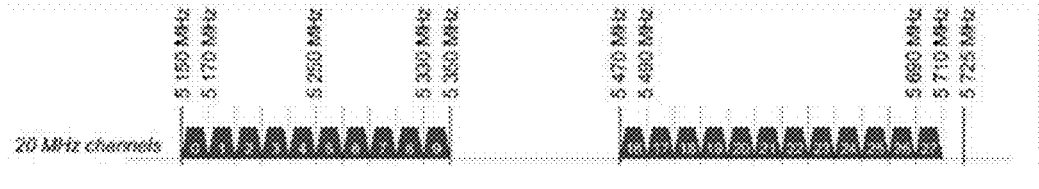

FIG. 4

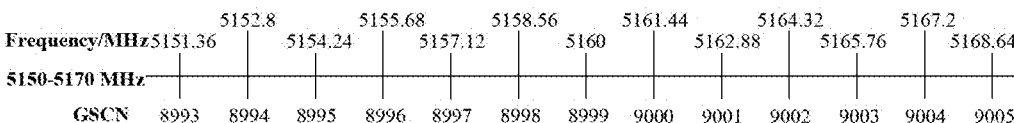

FIG. 5

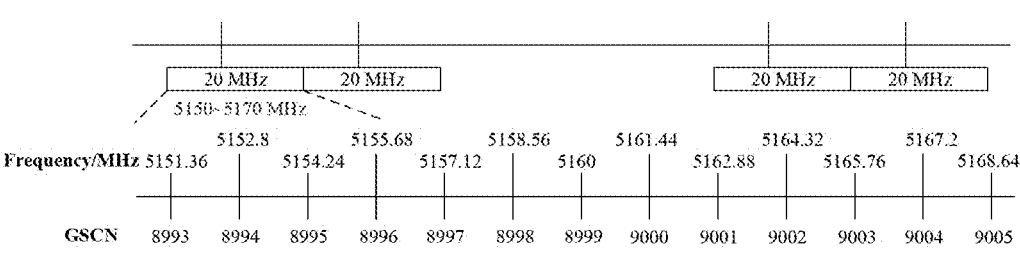

FIG. 6

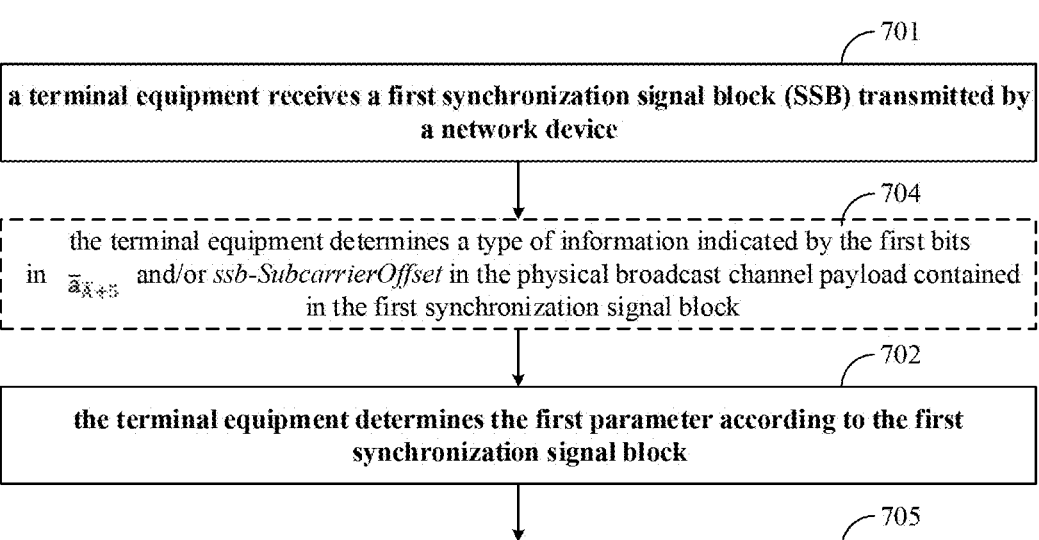

701 a terminal equipment receives a first synchronization signal block (SSB) transmitted by a network device

704 the terminal equipment determines a type of information indicated by the first bits in $\bar{a}_{\bar{A}+\bar{s}}$ and/or *ssb-SubcarrierOffset* in the physical broadcast channel payload contained in the first synchronization signal block

702 the terminal equipment determines the first parameter according to the first synchronization signal block

705 the terminal equipment determines whether to receive SIB1 according to whether the first synchronization signal block has associated SIB1 and/or a type of SIB1 associated with the first synchronization signal block

703 the terminal equipment receives the SIB1 associated with the first synchronization signal block or a second synchronization signal block according to the first parameter

FIG. 7

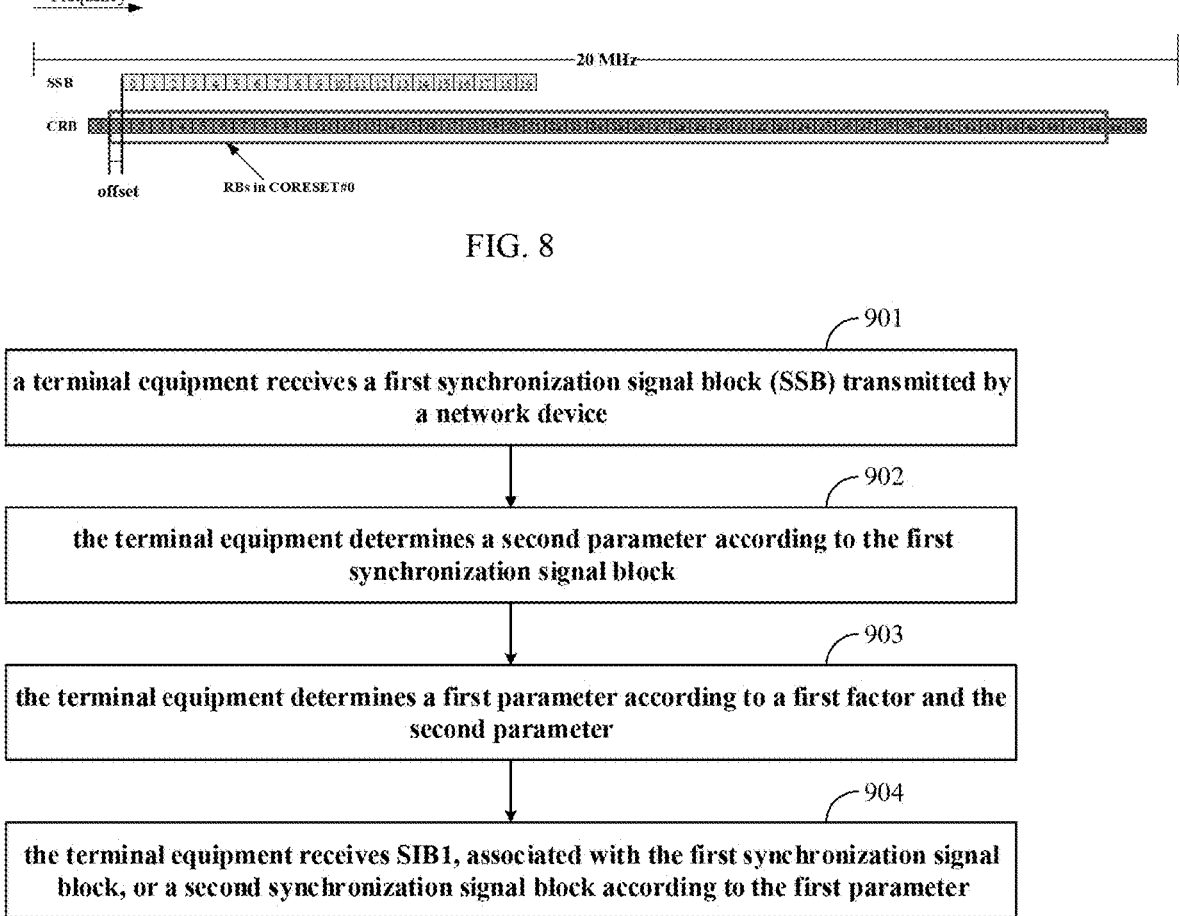

FIG. 8

901 a terminal equipment receives a first synchronization signal block (SSB) transmitted by a network device

902 the terminal equipment determines a second parameter according to the first synchronization signal block

903 the terminal equipment determines a first parameter according to a first factor and the second parameter

904 the terminal equipment receives SIB1, associated with the first synchronization signal block, or a second synchronization signal block according to the first parameter

FIG. 9

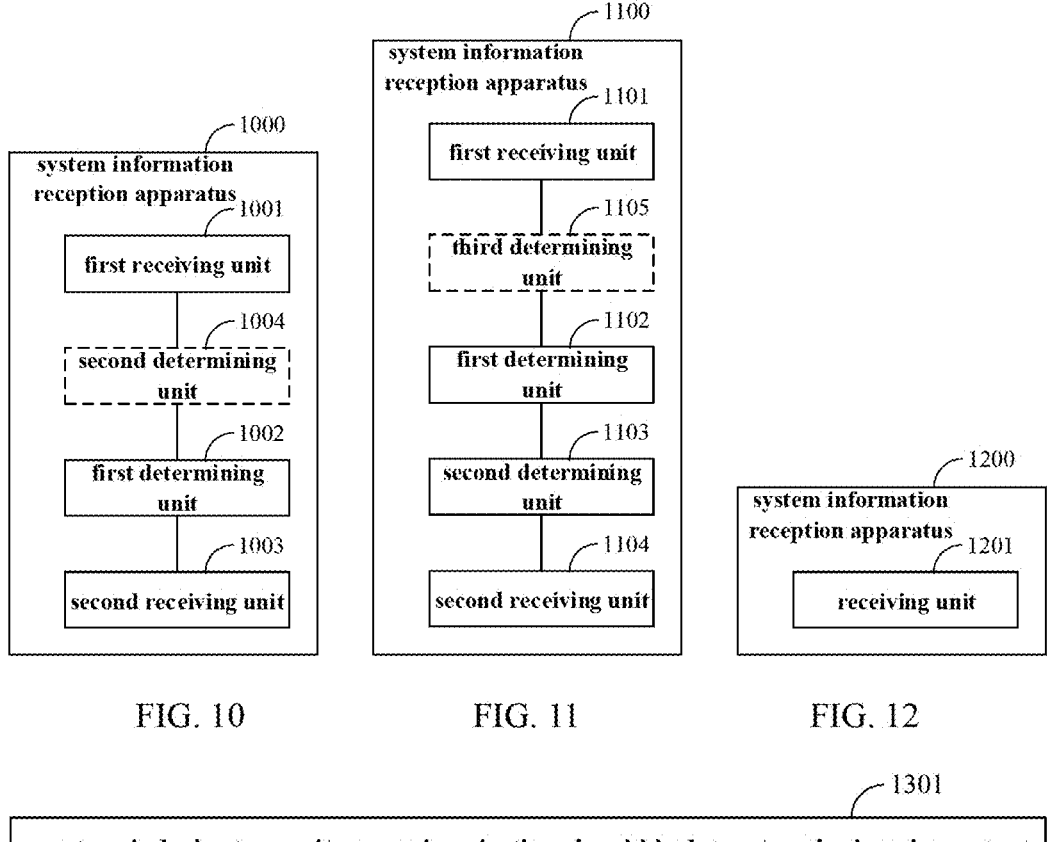
FIG. 10          FIG. 11          FIG. 12
a network device transmits a synchronization signal block to a terminal equipment, at least one bit of at least one of the indication fields in a physical broadcast channel payload contained in the synchronization signal block being used for indicating a QCL relationship between SSBs
FIG. 13
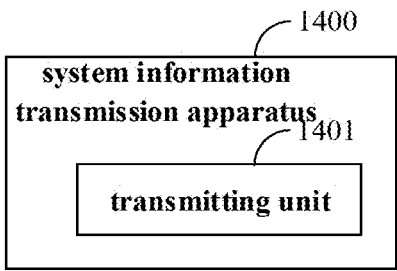
FIG. 14

SYSTEM INFORMATION RECEPTION METHOD AND APPARATUS

CROSS-REFERENCE TO RELATED APPLICATION

This application is a continuation application of International Application PCT/CN2020/084301 filed on Apr. 10, 2020, and designated the U.S., the entire contents of which are incorporated herein by reference.

FIELD

This disclosure relates to the field of communication technologies.

BACKGROUND

In Release 15 of New radio (Rel-15 NR), system information (SI) includes a master information block (MIB) and system information blocks (SIBs), and system information is divided into minimum system information (minimum SI) and other system information (other SI). The minimum SI includes basic information needed by a terminal equipment for performing initial access and information needed for obtaining the other SI. The minimum SI may be divided into two parts: MIB and SIB1.

The MIB includes cell bar status information and core physical layer information of a cell needed for receiving further system information, such as CORESET (e.g. CORESET #0) configuration, which may be used for monitoring or receiving a PDCCH (physical downlink control channel) used for scheduling a PDSCH (physical downlink shared channel) carrying SIB1. MIB is broadcast periodically on a BCH (broadcast channel).

SIB1 includes scheduling information of other SIBs and information needed for initial access. SIB1, also referred to as remaining minimum system information (RMSI), is periodically broadcast on a downlink shared channel (DL-SCH) or transmitted to a terminal equipment in a radio resource control connected (RRC_CONNECTED state) in a dedicated manner on a DL-SCH.

In some cases, for example, when the terminal equipment is in a radio resource control idle (RRC_IDLE) state or in a radio resource control inactive (RRC_INACTIVE) state, or the terminal equipment is in the RRC_CONNECTED state but a timer T311 is running, or a network device indicates the terminal equipment to report a cell global identifier (CGI), the terminal equipment needs to receive the MIB first, and then receive the periodically broadcast SIB1 according to the MIB.

At a physical layer, the MIB is transmitted on a physical broadcast channel (PBCH), and the PBCH is periodically broadcast as part of a synchronization signal block (SSB). However, the PBCH may indicate that the SSB where it is located has no associated SIB1, that is, the terminal equipment is unable to receive SIB1 according to the MIB carried by the PBCH. Furthermore, the PBCH may possibly also indicate a frequency-domain position where an SSB associated with SIB1 is located, or indicate that the terminal equipment may assume there is no frequency range of an SSB associated with SIB1.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in Release 16 of New radio (Rel-16 NR), operation on unlicensed spectrum/band or shared spectrum/band (NR-U, NR operation on unlicensed spectrum) will be supported.

In an unlicensed or shared frequency spectrum/band, in order to share spectral resources fairly and efficiently, a device needs to determine that a channel is not occupied by other devices before transmitting data via a channel access method or process. Therefore, a network device may possibly not be able to transmit an SSB due to that the channel is occupied by other devices. In addition, transmission power of the SSB and the number of SSBs that may be transmitted in a certain period of time or a length of time may also be limited by regulatory requirements. Therefore, in order to enhance cell coverage, more candidate SSB positions (such as being characterized by candidate SSB indices) are introduced into NR-U. For example, for SCS=15 kHz, one period includes 10 candidate SSB positions; and for SCS=30 kHz, one period includes 20 candidate SSB positions. Moreover, SSBs transmitted at different candidate SSB positions in one period (that is, SSBs corresponding to different candidate SSB indices) may be quasico-located (QCLed).

The terminal equipment may determine a QCL relationship between the SSBs according to a parameter, and then receive SIB1 according to the QCL relationship between the SSBs. In order that the terminal equipment is able to determine a QCL relationship between candidate SSBs at different time-domain positions after receiving the PBCH to receive SIB1, a value of the parameter needs to be indicated via the PBCH; however, there is currently no specific indication method yet. Furthermore, due to the limited number of bits that the PBCH is able to carry, bits of some indication fields defined in Rel-15 NR may possibly be reused to indicate the value of the parameter. However, this may affect other information that needs to be indicated by the PBCH, and the terminal equipment will be unable to receive system information (minimum SI) in the same way as in Rel-15.

Addressed to at least one of the above problems, embodiments of this disclosure provide a system information reception method and apparatus, in which for an unlicensed or shared spectrum/band, indicating the value of the above parameter by reusing the bits in the indication fields in the PBCH payload defined in Rel-15 NR is supported, while eliminating or avoiding effects on other necessary or important information needing to be indicated by the PBCH as possible, so that the system may operate normally and efficiently.

According to an aspect of the embodiments of this disclosure, there is provided a system information reception method, wherein the method includes:

a terminal equipment receives a synchronization signal block (SSB) transmitted by a network device, at least one bit of at least one of the following indication fields in a physical broadcast channel (PBCH) payload contained in the synchronization signal block being used for indicating a QCL relationship between SSBs:

intraFreqReselection;

subCarrierSpacingCommon;

$\overline{a}_{\overline{A}+6}$;

pdcch-ConfigSIB1;

$\overline{a}_{\overline{A}+5}$ and ssb-SubcarrierOffset.

According to another aspect of the embodiments of this disclosure, there is provided a system information reception apparatus, configured in a terminal equipment, wherein the apparatus includes:

a receiving unit configured to receive a synchronization signal block (SSB) transmitted by a network device, at least one bit of at least one of the following indication fields in a physical broadcast channel (PBCH) payload contained in the synchronization signal block being used for indicating a QCL relationship between SSBs:

intraFreqReselection;

subCarrierSpacingCommon;

$\overline{a}_{\overline{A}+6}$;

pdcch-ConfigSIB1;

$\overline{a}_{\overline{A}+5}$ and ssb-SubcarrierOffset.

According to a further aspect of the embodiments of this disclosure, there is provided a system information reception method, wherein the method includes:

a terminal equipment receives a first synchronization signal block (SSB) transmitted by a network device, the first synchronization signal block being transmitted on an unlicensed or shared spectrum/band, and/or a first bit in ssb-SubcarrierOffset and/or $\overline{a}_{\overline{A}+5}$ in a physical broadcast channel payload contained in the first synchronization signal block being used for indicating a QCL relationship between SSBs or being not used for indicating a first parameter;

the terminal equipment determines the first parameter according to the first synchronization signal block, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and the terminal equipment receives the SIB1, associated with the first synchronization signal block, or a second synchronization signal block according to the first parameter.

According to yet another aspect of the embodiments of this disclosure, there is provided a system information reception apparatus, configured in a terminal equipment, wherein the apparatus includes:

a first receiving unit configured to receive a first synchronization signal block (SSB), the first synchronization signal block being transmitted on an unlicensed or shared spectrum/band, and/or a first bit in ssb-SubcarrierOffset and/or $\overline{a}_{\overline{A}+5}$ in a physical broadcast channel payload contained in the first synchronization signal block being used for indicating a QCL relationship between SSBs or being not used for indicating a first parameter;

a first determining unit configured to determine the first parameter according to the first synchronization signal block, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and a second receiving unit configured to receive the SIB1, associated with the first synchronization signal block, or a second synchronization signal block according to the first parameter.

According to still another aspect of the embodiments of this disclosure, there is provided a system information reception method, wherein the method includes:

a terminal equipment receives a first synchronization signal block (SSB) transmitted by a network device;

the terminal equipment determines a second parameter according to the first synchronization signal block;

the terminal equipment determines a first parameter according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and the terminal equipment receives the SIB1, associated with the first synchronization signal block, or a second synchronization signal block according to the first parameter.

According to yet still another aspect of the embodiments of this disclosure, there is provided a system information reception apparatus, configured in a terminal equipment, wherein the apparatus includes:

a first receiving unit configured to receive a first synchronization signal block (SSB);

a first determining unit configured to determine a second parameter according to the first synchronization signal block;

a second determining unit configured to determine a first parameter according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and a second receiving unit configured to receive the SIB1, associated with the first synchronization signal block, or a second synchronization signal block according to the first parameter.

An advantage of the embodiments of this disclosure exists in that for an unlicensed or shared spectrum/band, indicating the value of the above parameter (referred to as a third parameter, such as a value of Q) by reusing a bit in the indication fields in the PBCH payload defined in Rel-15 NR is supported, while eliminating or avoiding effects on other necessary or important information needing to be indicated by the PBCH as possible, so that the system may operate normally and efficiently.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments.

Moreover, in the drawings, like reference numerals designate corresponding parts throughout the several views and may be used to designate like or similar parts in more than one embodiment.

FIG. 1 is schematic diagram of a communication system of an embodiment of this disclosure;

FIG. 2 is a schematic diagram of a system information reception method of an embodiment of this disclosure;

FIG. 3 is a schematic diagram of a mapping relationship between a resource unit of an SSB and a sync raster where it is located;

FIG. 4 is an exemplary diagram of channel division;

FIG. 5 is an exemplary diagram of a frequency position of a sync raster and a corresponding GSCN in Rel-15 NR;

FIG. 6 is an exemplary diagram of a frequency position of a sync raster and a corresponding GSCN in NR-U;

FIG. 7 is a schematic diagram of a system information reception method of an embodiment of this disclosure;

FIG. 8 is an exemplary diagram of an offset between an SSB and a CRB grid;

FIG. 9 is another schematic diagram of the system information reception method of the embodiment of this disclosure;

FIG. 10 is a schematic diagram of a system information reception apparatus of an embodiment of this disclosure;

FIG. 11 is another schematic diagram of the system information reception apparatus of the embodiment of this disclosure;

FIG. 12 is a schematic diagram of a system information reception apparatus of an embodiment of this disclosure;

FIG. 13 is a schematic diagram of a system information transmission method of an embodiment of this disclosure;

FIG. 14 is a schematic diagram of a system information transmission apparatus of an embodiment of this disclosure;

DETAILED DESCRIPTION

Figure 15:
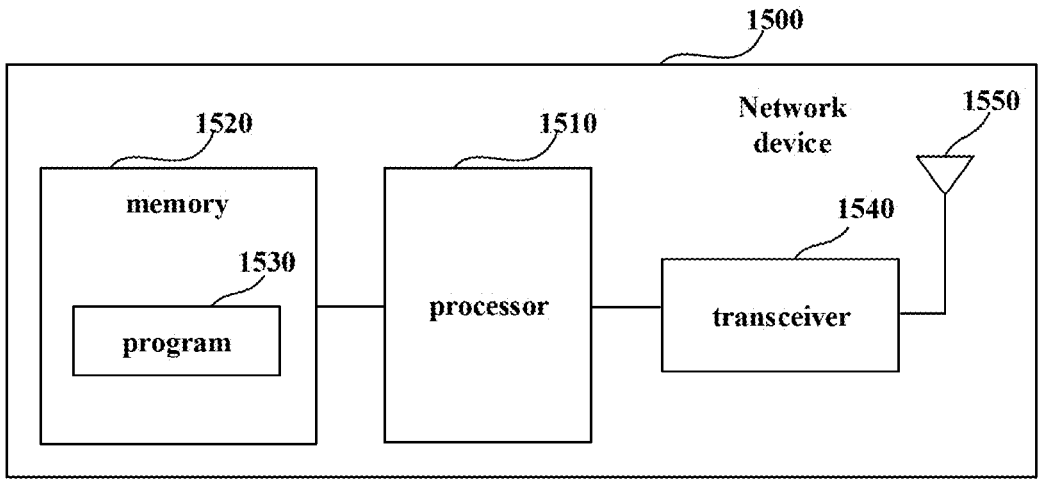
FIG. 15 is a schematic diagram of a network device of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE) or terminal device" refers to, for example, an equipment accessing to a communication network and receiving network services via a network device, and may also be referred to as. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios of the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as an example is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

In the following description, without causing confusion, terms "uplink control signal" and "uplink control information (UCI)" or "physical uplink control channel (PUCCH)" are interchangeable, and terms "uplink data signal" and "uplink data information" or "physical uplink shared channel (PUSCH)" are interchangeable.

Terms "downlink control signal" and "downlink control information (DCI)" or "physical downlink control channel (PDCCH)" are interchangeable, and terms "downlink data signal" and "downlink data information (DCI)" or "physical downlink shared channel (PDSCH)" are interchangeable.

In addition, transmitting or receiving a PUSCH may be understood as transmitting or receiving uplink data carried by the PUSCH, and transmitting or receiving a PUCCH may be understood as transmitting or receiving uplink information carried by the PUCCH; uplink signals may include uplink data signals and/or uplink control signals, etc., which may also be referred to as uplink transmissions (UL transmissions) or uplink information or uplink channels. And transmitting an uplink transmission on an uplink resource may be understood as transmitting the uplink transmission by using the uplink resource.

In the embodiment of this disclosure, higher-layer signaling may be, for example, radio resource control (RRC) signaling, such as being referred to as an RRC message, and including MIB, system information, and a dedicated RRC message; or being referred to as an RRC IE (RRC information element). The higher-layer signaling may also be, for example, MAC (media access control) signaling, or may be referred to as a MAC IE (MAC information element). However, this disclosure is not limited thereto.

English or Chinese names of some abbreviations/terms involved in this disclosure are as follows:

| BCH | Broadcast Channel | 广播信道 |
|---|---|---|
| CD-SSB | Cell Defining SSB | 小区定义同步信号块 |
| CGI | Cell Global Identifier | 小区全局标识 |
| | | (for NR cell (licensed or unlicensed spectrum/band), which may also be referred to as NCGI) |
| CORESET | COntrol REsource SET | 控制资源集合 |
| CRB | Common Resource Block | 公共资源块 |
| DL-SCH | Downlink Shared Channel | 下行共享信道 |
| DM-RS | Demodulation reference signal | 解调参考信号 |
| FR | Frequency Range | 频率范围 |
| GSCN | Global Synchronization Channel Number | 全球同步信道号 |
| LSB | Least Significant Bit | 最低有效位 |

| MIB | Master Information Block | 主信息块 |
|---|---|---|
| MSB | Most Significant Bit | 最高有效位 |
| NCGI | NR Cell Global Identifier | 小区全局标识 |
| NR | New Radio/NR Radio Access | 新空口(或新无线)或 NR 无线接入 |
| PBCH | Physical Broadcast Channel | 物理广播信道 |
| PCI | Physical Cell Identifier | 物理小区标识 |
| PDCCH | Physical Downlink Control Channel | 物理下行控制信道 |
| PDSCH | Physical Downlink Shared Channel | 物理下行共享信道 |
| PHY/Layer 1 | PHYsical layer | 层1/物理层 |
| PLMN | Public Land Mobile Network | 公共陆地移动网络 |
| PRB | Physical Resource Block | 物理资源块 (which is interchangeable/equivalent with RB in some cases) |
| PSS | Primary Synchronisation Signal | 主同步信号 |
| QCL | Quasi co-location | 准共址或准共站址 |
| RB | Resource Block | 资源块 |
| RE | Resource Element | 资源元素 |
| RMSI | Remaining minimum system information | 剩余最小系统信息也称为 SIB1 (system information block 1) |
| RRC | Radio Resource Control | 无线资源控制 |
| SC | Sub-Carrier | 子载波 |
| scs | Sub-Carrier Spacing | 子载波间隔 |
| SF | Sub-Frame | 帧 |
| SFN | System frame number | 系统帧号 |
| SI | System Information | 系统信息 |
| SIB | SystemInformationBlock | 系统信息块 |
| SS | Synchronization signal | 同步信号 |
| SSB | Synchronization Signal Block或 SS/PBCH block | 同步信号块, 或同步信号/物理广播信道块 |
| SSS | Secondary Synchronisation Signal | 辅同步信号 |
| | sync raster | 同步光栅 |

In various aspects of the embodiments of this disclosure, such words as learning, determining, judging, and calculating, etc., have similar meanings, and may be replaced with each other in certain cases.

For the convenience of understanding, some concepts involved in this disclosure are described below by means of the accompanying drawings.

Figure 17:
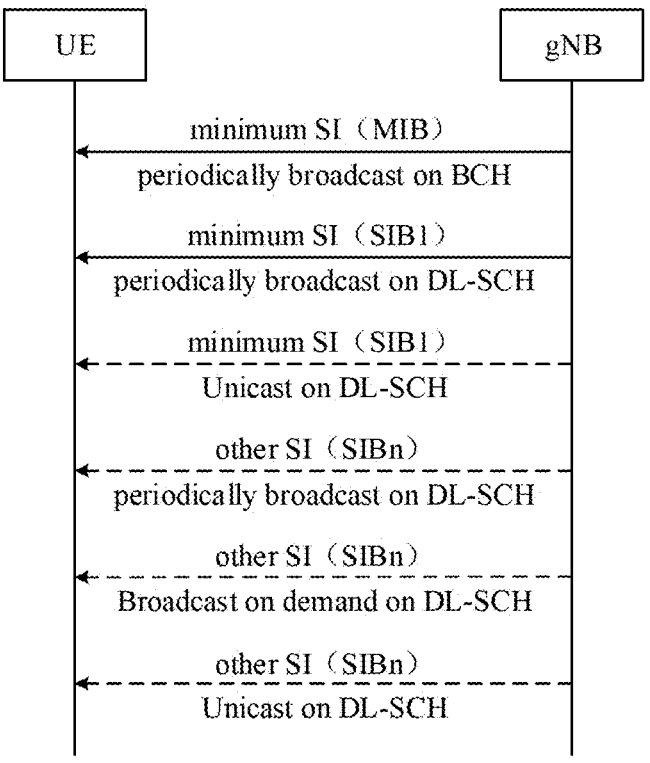
FIG. 17 is a schematic diagram of system information acquisition.
Figure 18:
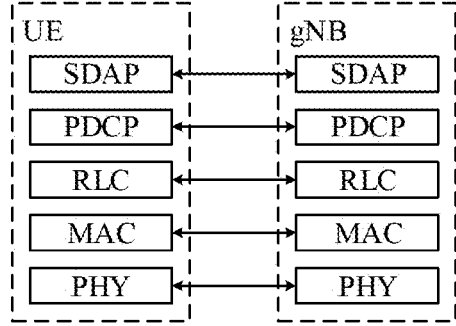
FIG. 18 is a schematic diagram of a user-plane protocol stack inter-layer relationship.
Figure 19:
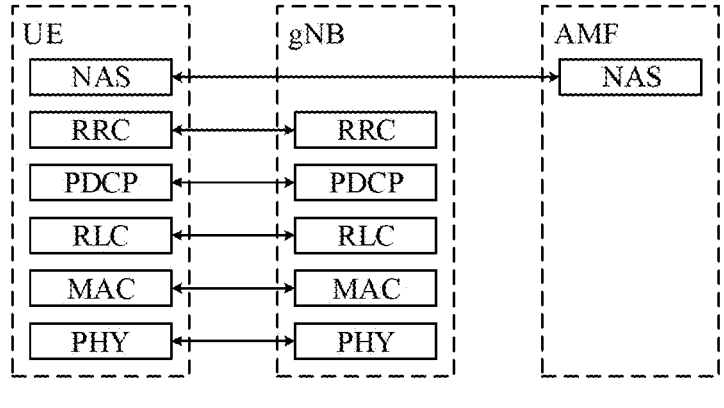
FIG. 19 is a schematic diagram of a control-plane protocol stack inter-layer relationship.
Figure 20:
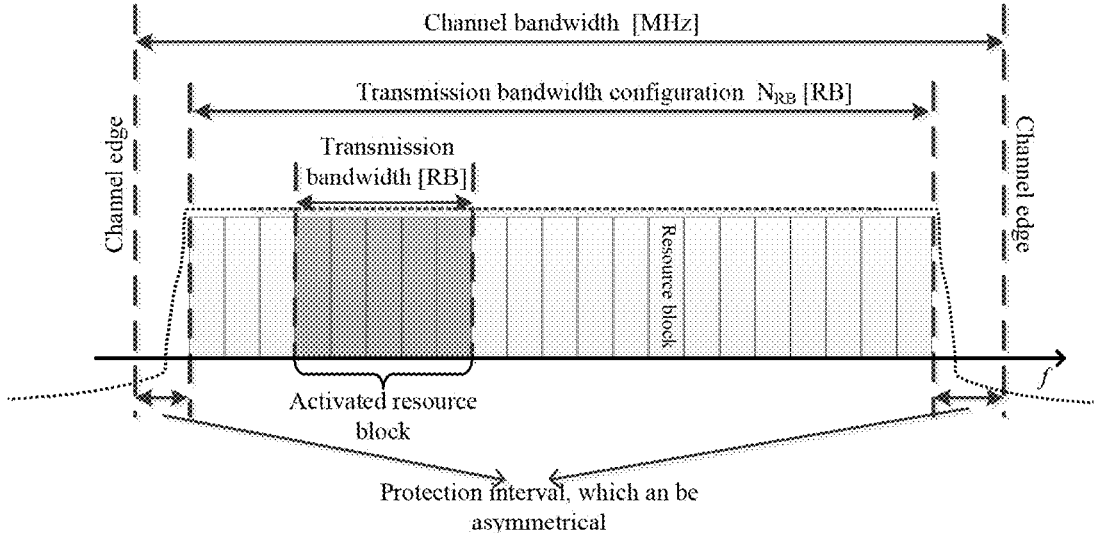
FIG. 20 is a schematic diagram of a frequency-domain resource.
Figure 21:
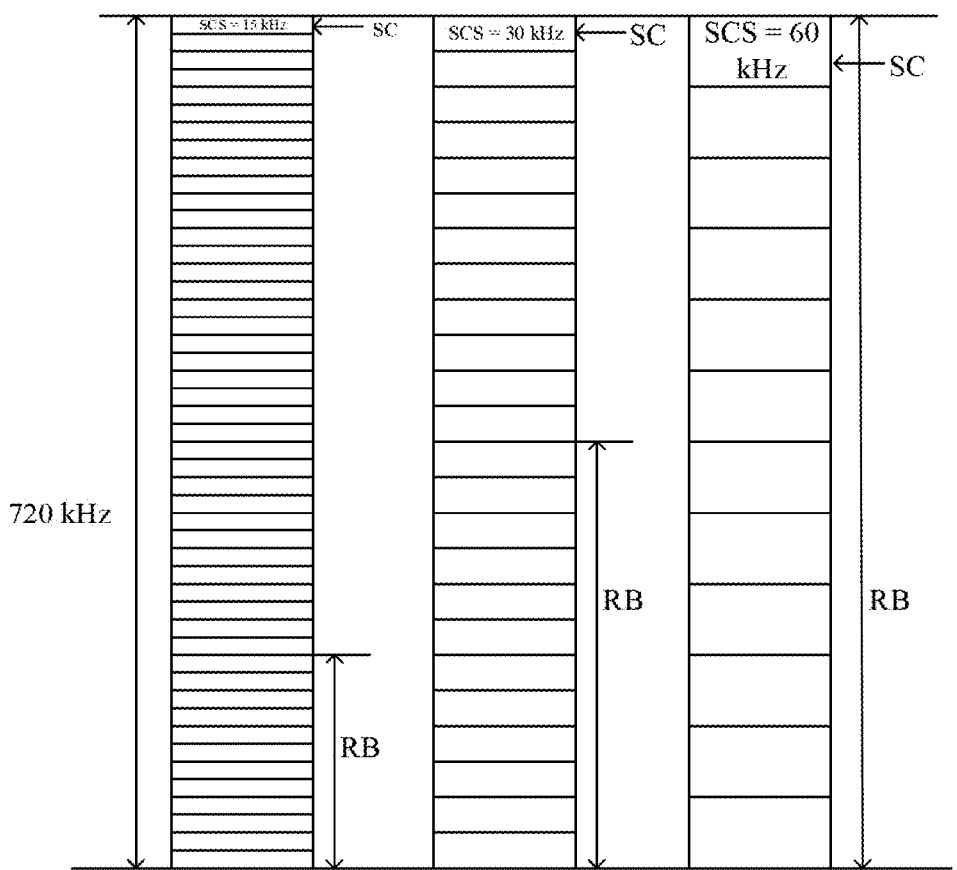
FIG. 21 is a schematic diagram of a relationship between a subcarrier spacing, a bandwidth and the number of resource blocks (RBs)
Figure 22:
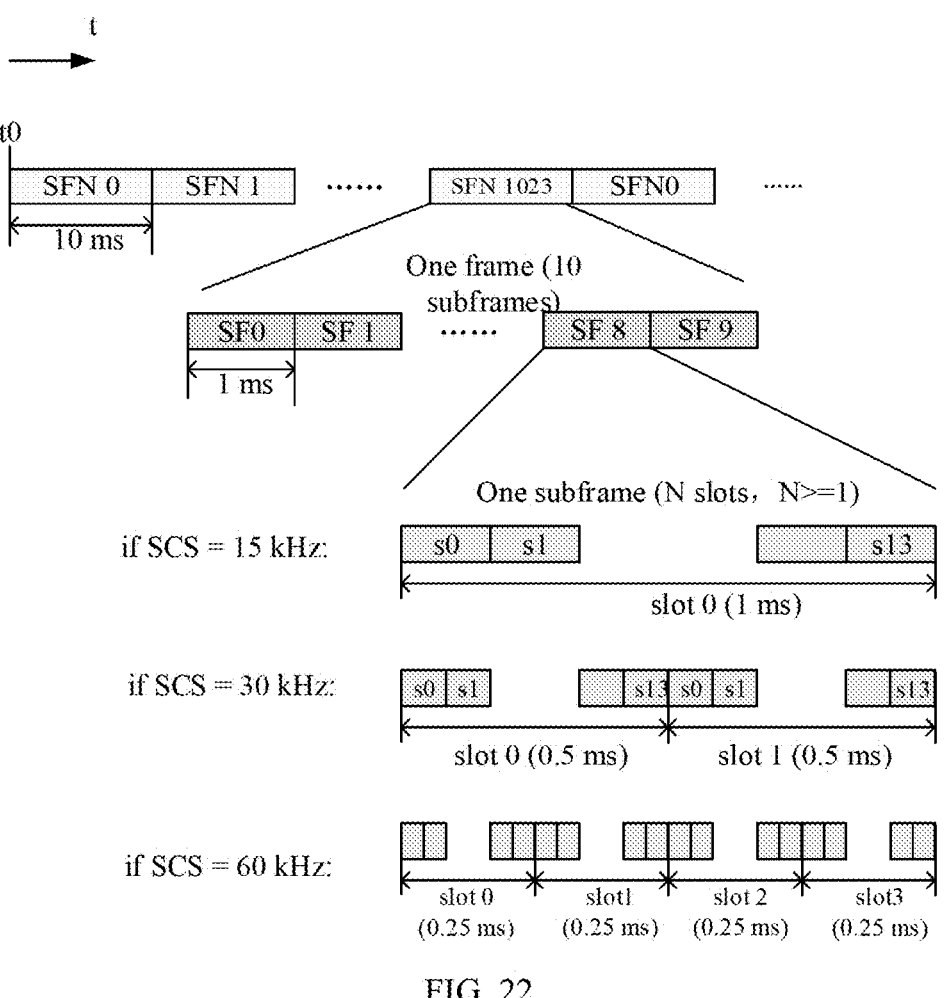
FIG. 22 is a schematic diagram of a time-domain resource.
Figure 23:
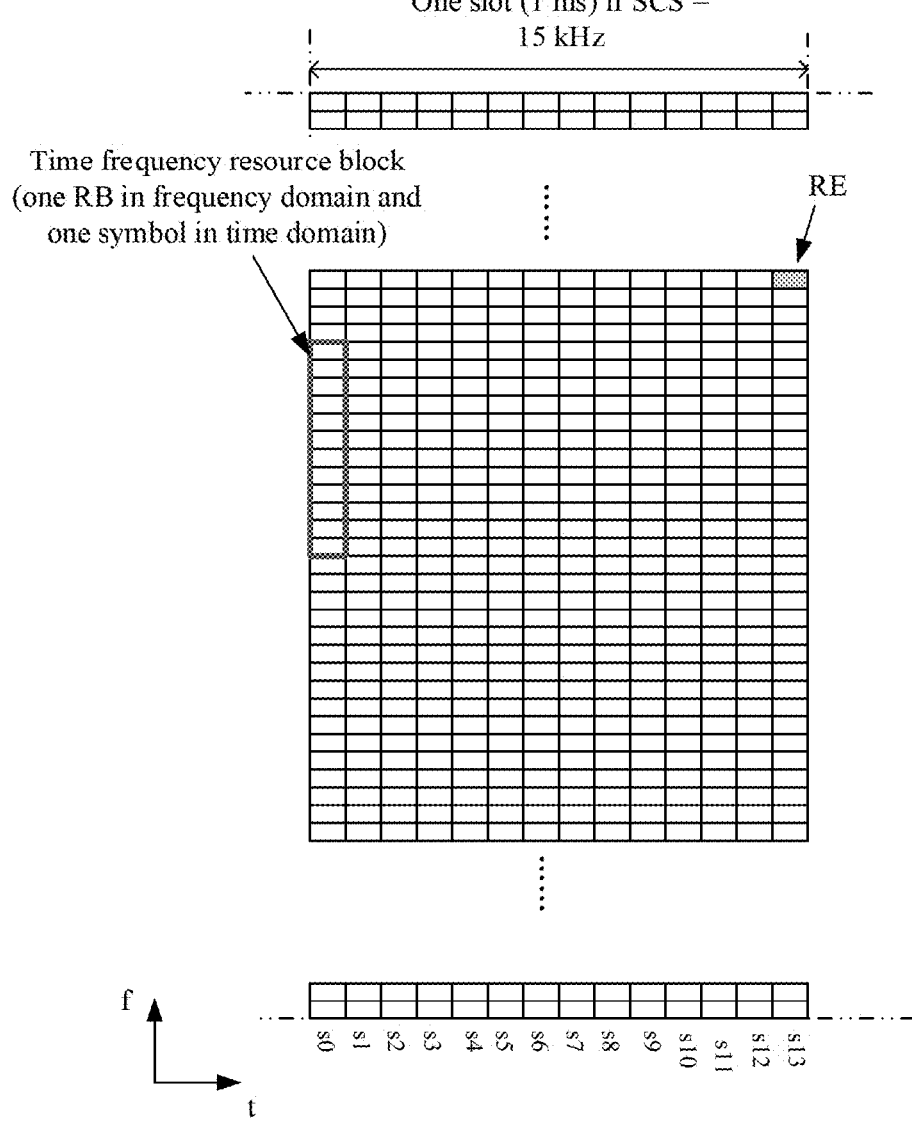
FIG. 23 is a schematic diagram of a physical time-frequency resource.
Figure 24:
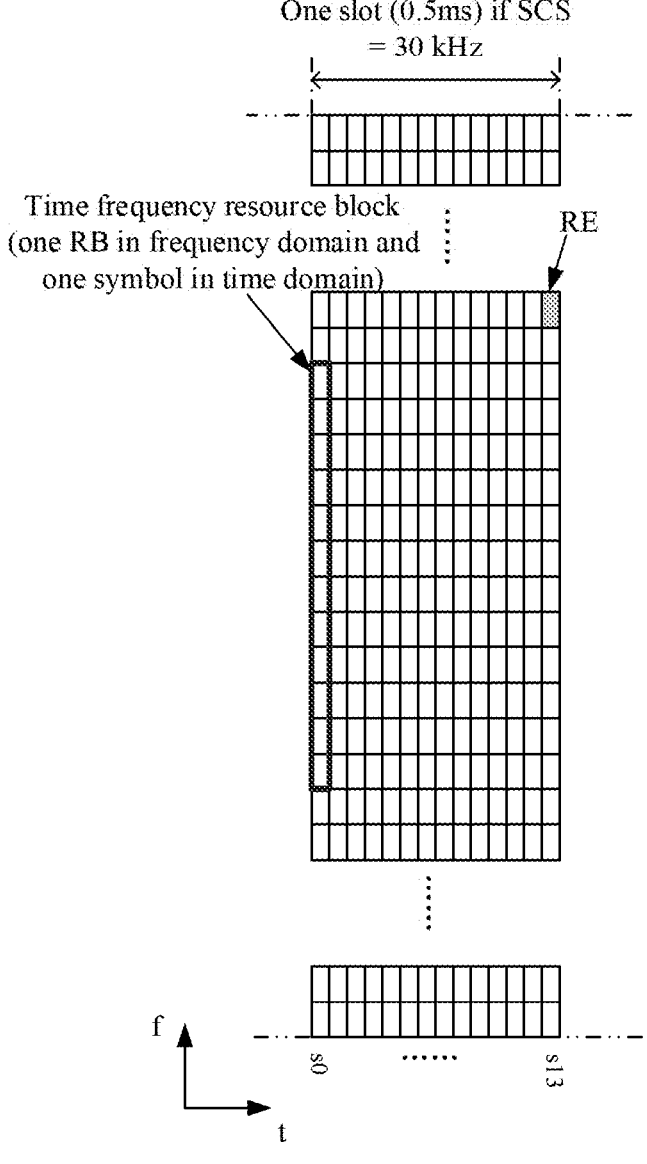
FIG. 24 is another schematic diagram of the physical time-frequency resource.
Figure 25:
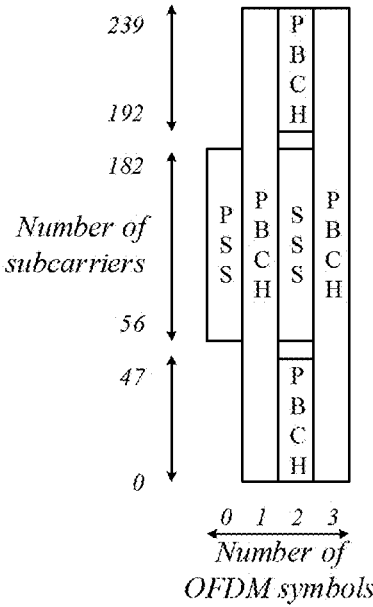
FIG. 25 is a schematic diagram of a structure of an SSB.
Figure 26:
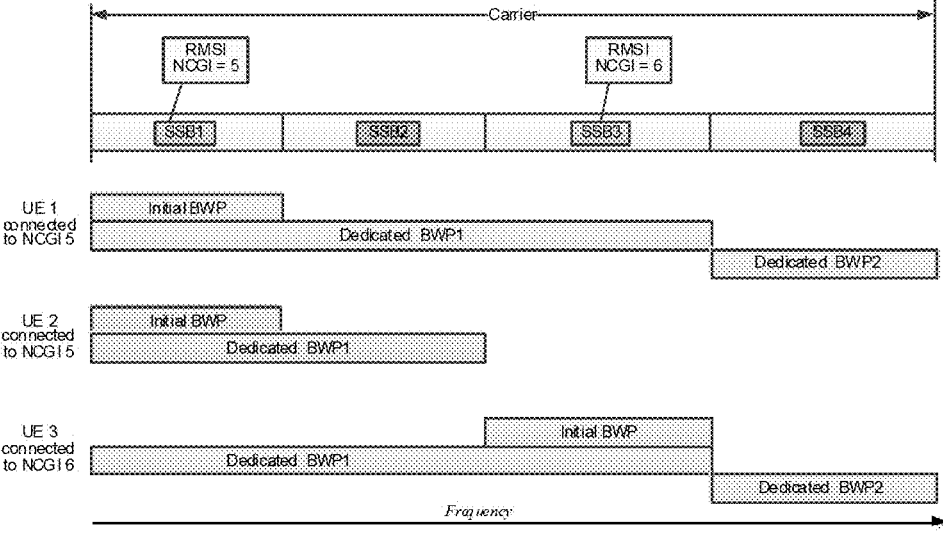
FIG. 26 is a schematic diagram of frequency-domain positions of SSBs.
Figure 27:
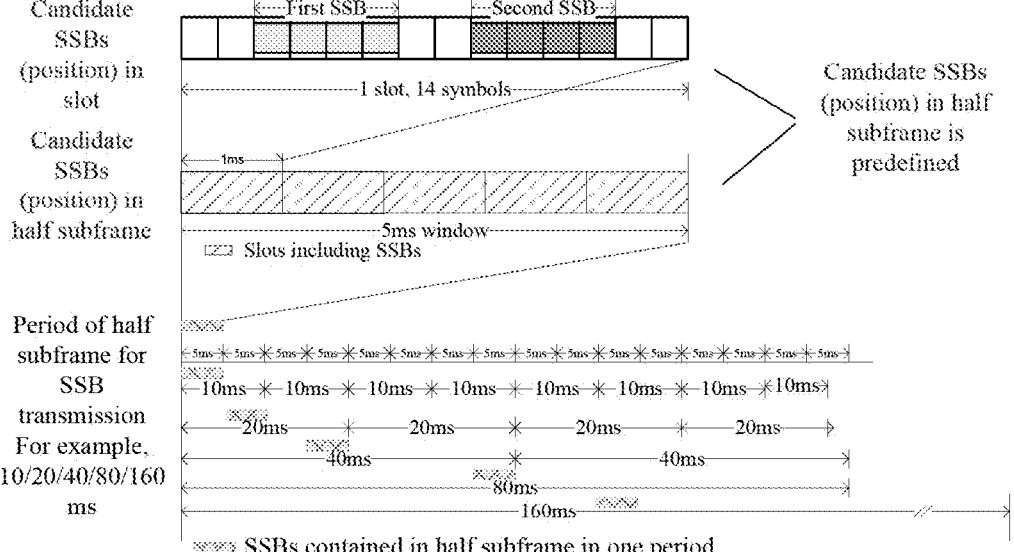
FIG. 27 is a schematic diagram of periodic transmission of an SSB on the time domain.
Figure 28:
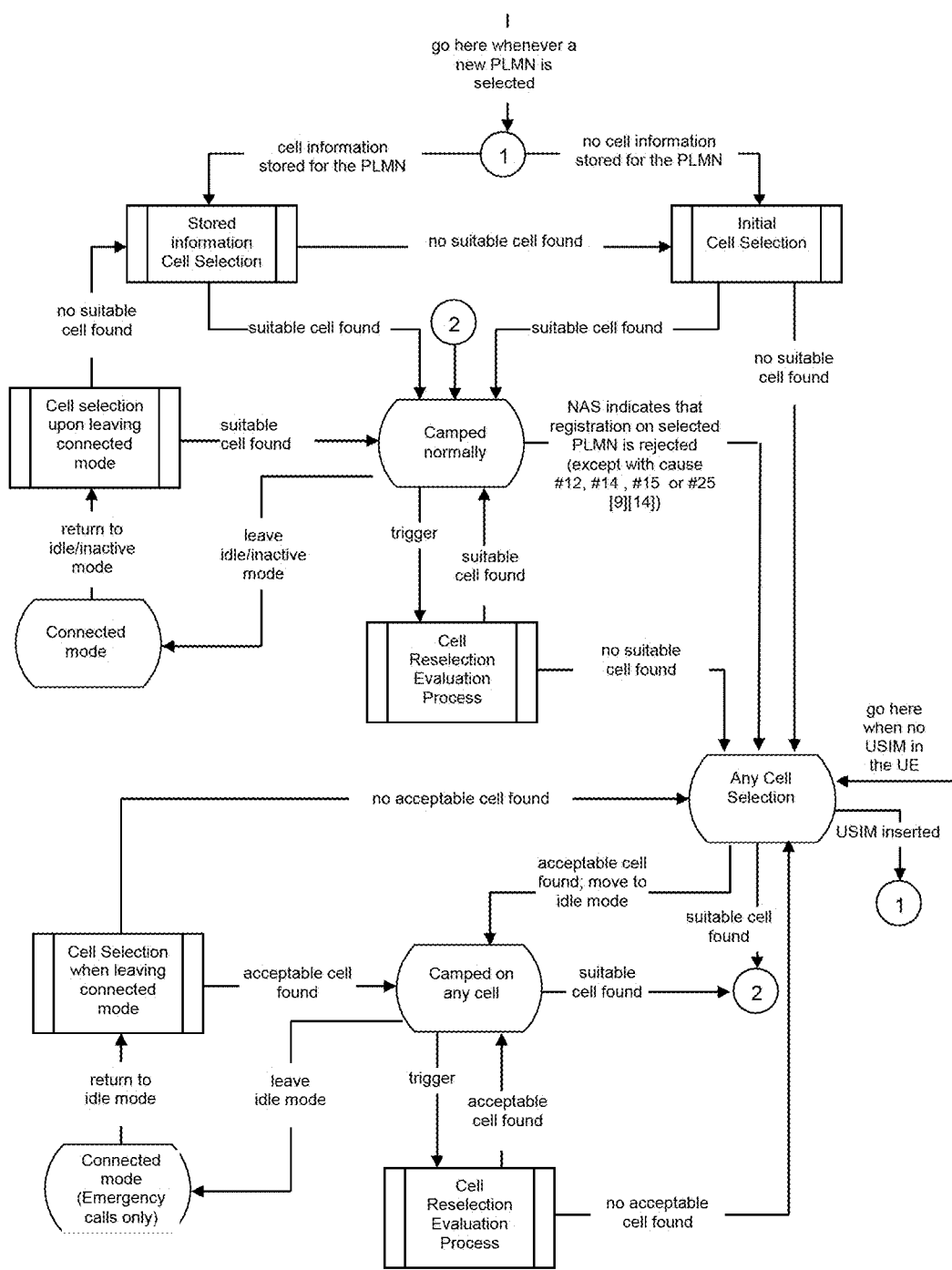
FIG. 28 is a schematic diagram of a cell selection or reselection process.
Figure 29:
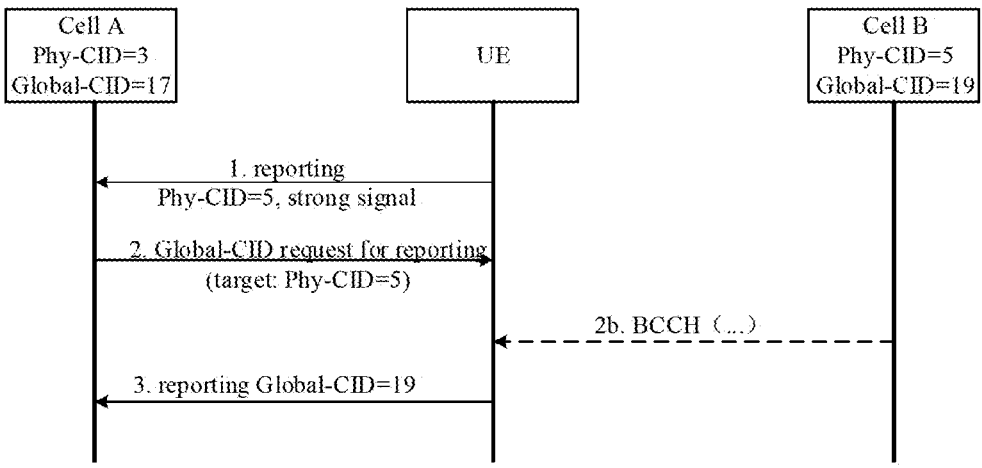
FIG. 29 is a schematic diagram of a CGI reporting process.
Figure 30:
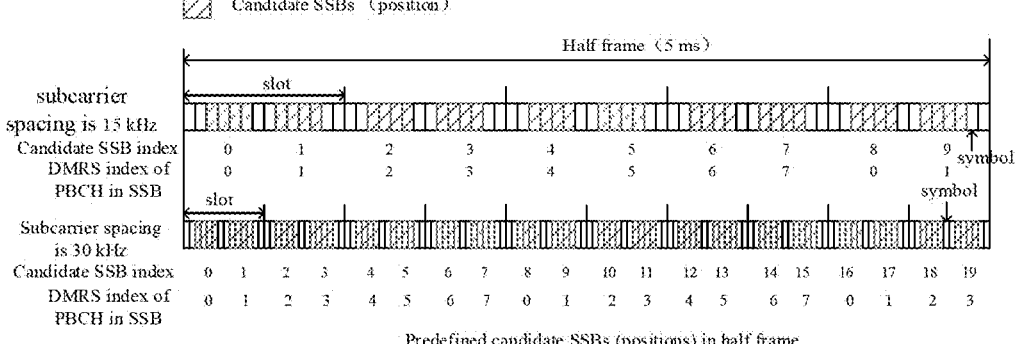
FIG. 30 is a schematic diagram of positions of predefined candidate SSBs in a half frame.
Figure 31:
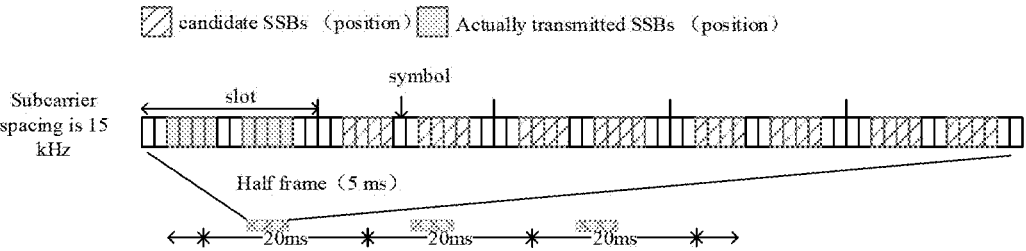
FIG. 31 is a schematic diagram of that positions of actually-transmitted SSBs are subsets of the positions of the predefined candidate SSBs.

FIG. 17 is a schematic diagram of system information acquisition, taking that a terminal equipment is a UE and a network device is a gNB as examples, wherein operations shown by dotted lines are optional. FIG. 18 is a schematic diagram of a user-plane protocol stack inter-layer relationship, taking that a terminal equipment is a UE and a network device is a gNB as examples. FIG. 19 is a schematic diagram of a control-plane protocol stack inter-layer relationship, taking that a terminal equipment is a UE and a network device is a gNB as examples. FIG. 20 is a schematic diagram of a frequency-domain resource, taking that a resource block (RB) includes 12 subcarriers (SCs) as an example. FIG. 21 is a schematic diagram of a relationship between a subcarrier spacing, a bandwidth and the number of resource blocks (RBs). FIG. 22 is a schematic diagram of a time-domain resource, wherein a time unit on a time domain includes a frame, a subframe, a slot and a symbol; FIG. 22 shows time units at different subcarrier spacings, wherein s0 refers to a first symbol in a slot, and so on. FIG. 23 is a schematic diagram of a physical time-frequency resource, taking that SCS=15 kHz as an example, wherein s0 refers to a first symbol in a slot, and so on. FIG. 24 is another schematic diagram of the physical time-frequency resource, taking that SCS=30 kHz as an example, wherein s0 refers to a first symbol in a slot, and so on. FIG. 25 is a schematic diagram of a structure of an SSB. FIG. 26 is a schematic diagram of frequency-domain positions of SSBs, showing whether the SSBs have associated SIB1s, wherein there are SSBs at different frequency-domain positions on a carrier, SSB1 and SSB3 have associated SIB1s, and SSB2 and SSB4 have no associated SIB1. FIG. 27 is a schematic diagram of periodic transmission of an SSB on the time domain, taking that a subcarrier spacing of an SSB is 15 kHz as an example. FIG. 28 is a schematic diagram of a cell selection or reselection process, wherein in order to obtain cell information, it is necessary to receive system information of a cell. FIG. 29 is a schematic diagram of a CGI reporting process, wherein in order to obtain a Global-CID (or CGI) of a cell, it is necessary to receive system information of the cell. FIG. 30 is a schematic diagram of positions of predefined candidate SSBs in a half frame. And FIG. 31 is a schematic diagram of that positions of actually-transmitted SSBs are subsets of the positions of the predefined candidate SSBs.

The embodiments of this disclosure shall be described below with reference to the accompanying drawings.

EMBODIMENT OF A FIRST ASPECT

The embodiment of this disclosure provides a system information reception method, which shall be described from a terminal equipment side.

FIG. 2 is a schematic diagram of the system information reception method of the embodiment of this disclosure. As shown in FIG. 2, the method includes:

201: a terminal equipment receives a synchronization signal block (SSB) transmitted by a network device, at least one bit of at least one of the following indication fields in a physical broadcast channel (PBCH) payload contained in the synchronization signal block being used for indicating a QCL relationship between SSBs:

intraFreqReselection;
subCarrierSpacingCommon;
$\bar{a}_{\bar{A}+6}$;
pdcch-ConfigSIB1;
$\bar{a}_{\bar{A}+5}$ and ssb-SubcarrierOffset.

In Rel-15 NR, the PBCH payload includes the following information:

| | | | field | Size(bit) |
|---|---|---|---|---|
| PBCH payload | higher-layer payload (BCCH-BCH-Message) | MIB | systemFrameNumber | 6 |
| | | | subCarrierSpacingCommon | 1 |
| | | | ssb-SubcarrierOffset | 4 |
| | | | dmrs-TypeA-Position | 1 |
| | | | pdcch-ConfigSIB1 | 8 |
| | | | cellBarred | 1 |
| | | | intraFreqReselection | 1 |
| | | | spare | 1 |
| | | messageClassExtension | | 1 |
| | L1 payload | | $\bar{a}_{\bar{A}}\bar{a}_{\bar{A}+1}, \bar{a}_{\bar{A}+2}, \bar{a}_{\bar{A}+3}$ | 4 |
| | | | $\bar{a}_{\bar{A}+4}$ | 1 |
| | | | $\bar{a}_{\bar{A}+5}$ | 1 |
| | | | $\bar{a}_{\bar{A}+6}$ | 1 |
| | | | $\bar{a}_{\bar{A}+7}$ | 1 |

In the above table, the "higher-layer payload" includes bits generated by a higher layer (e.g. an RRC layer). In this disclosure, for the convenience of expression, each field in messageClassExtension and MIB is regarded as an indication field in the PBCH payload, respectively.

Furthermore, in the above table, the "L1 payload" includes bits generated by a physical layer, such as $\bar{a}_{\bar{A}}$, $\bar{a}_{\bar{A}+1}$, $\bar{a}_{\bar{A}+2}$, . . . $\bar{a}_{\bar{A}+7}$. In this disclosure, for the convenience of expression, each bit generated by the physical layer is regarded as an indication field in the PBCH payload.

In the embodiment of this disclosure, at least one of the above intraFreqReselection, subCarrierSpacingCommon, $\bar{a}_{\bar{A}+6}$, pdcch-ConfigSIB1, and $\bar{a}_{\bar{A}+5}$ and ssb-SubcarrierOffset in the PBCH payload may be used to indicate the QCL relationship between SSBs.

In some embodiments, the above at least one bit may indicate the QCL relationship between SSBs by indicating a third parameter, the third parameter may be characterized by Q, or may be characterized by $$N_{SSB}^{QCL};$$

however, this disclosure is not limited thereto, and the third parameter may also be characterized by other signs.

The QCL relationship between SSBs may be determined according to the third parameter; for example, according to $$\left(N_{DM-RS}^{PBCH} \bmod N_{SSB}^{QCL}\right)$$

or according to a value of $$\left(\bar{\iota} \bmod N_{SSB}^{QCL}\right),$$

the terminal equipment may determine the QCL relationship between SSBs; where, $$N_{DM-RS}^{PBCH}$$

is an index of a DMRS sequence of the PBCH in the SSB, and $\bar{\iota}$ is a candidate SS/PBCH block index, wherein SSBs corresponding to identical values are QCLed, the values, for example, being characterized by SS/PBCH block indices.

In some embodiments, intraFreqReselection in the PBCH payload (more specifically, in the MIB) is used to indicate the third parameter or other information.

In Rel-15 NR, when a highest ranked (or graded) cell on a frequency is barred (such as when its cellBarred is set to be barred), or is deemed as being barred by the terminal equipment (such as when its cellBarred is set to be not-Barred, but the terminal equipment fails in receiving its SIB1), if its intraFreqReselection is set to be notAllowed, the terminal equipment deems that selecting or reselecting cells on the same frequency as the cell is not allowed, that is, the terminal equipment will not select/reselect the cells on the same frequency as the cell; otherwise, the terminal equipment deems that selecting or reselecting cells on the same frequency as the cell is allowed, that is, the terminal equipment may select/reselect the cells on the same frequency as the cell.

However, in NR-U, as there may be networks of different operators on the same spectrum/band, some problems may be incurred if intraFreqReselection is used according to the method in Rel-15 NR to indicate whether the terminal equipment is allowed to select/reselect cells on the same frequency as the cell. For example, a terminal equipment of a first operator may receive SSBs of a cell of a second operator, while the cell is a highest ranked cell and is barred or deemed as being barred by the terminal equipment. According to the above method, if its intraFreqReselection is set to be notAllowed, the terminal equipment will deem that selecting/reselecting cells on the same frequency as the cell is not allowed, and it will result in that the terminal equipment is unable to continue to receive the SSBs of the cell of first operator on this frequency, thereby affecting performing cell selection by the terminal equipment of the first operator.

Therefore, in NR-U, the terminal equipment should not use the method in the above Rel-15 NR to determine whether the selection/reselection of cells on the same frequency as the cell is allowed, and a new method needs to be introduced. For example, in NR-U, the terminal equipment assumes that intraFreqReselection is set to be notAllowed in selecting or reselecting (denoted as selecting/reselecting) a cell. That is, the terminal equipment ignores a value of intraFreqReselection in the received PBCH payload (more specifically, in the MIB) in selecting/reselecting a cell, and even if the value of intraFreqReselection in the received PBCH payload (more specifically, in the MIB) is allowed, the terminal equipment deems it as being notAllowed in selecting/reselecting a cell. This situation may be, for example, described as "When cell status "barred" is indicated or to be treated as if the cell status is "barred", if the cell operates in unlicensed/shared spectrum, perform cell re-selection as if intraFreqReselection is set to not allowed".

On this basis, the terminal equipment may select/reselect a cell, for example, according to the following method:

When cell status "barred" is indicated or to be treated as if the cell status is "barred",
....
- else:
    - If the field intraFreqReselection in MIB message is set to be "not allowed":
        - If the cell operates in licensed spectrum or if this cell belongs to a PLMN
          which is indicated as being equivalent to the registered PLMN:
          - the UE shall not re-select a cell on the same frequency as the barred cell.
      - else:
          - the UE may select to another cell on the same frequency if reselection
          criteria are fulfilled.
    The UE shall exclude the barred cell and, if the cell operates in licensed spectrum
or if this cell belongs to a PLMN which is indicated as being equivalent to the registered
PLMN, also the cells on the same frequency as a candidate for cell selection/reselection for
300 seconds.

In this way, the terminal equipment does not need to determine how to select/reselect a cell according to intraFreqReselection in the PBCH payload (more specifically, in the MIB), and intraFreqReselection in the PBCH payload (more specifically, in the MIB) may be used to indicate the above third parameter or other information. For example, for indicating the above third parameter, the terminal equipment determines the third parameter according to intraFreqReselection in the PBCH payload (more specifically, in the MIB), and then determines the QCL relationship between SSBs.

In some embodiments, subCarrierSpacingCommon in the PBCH payload (more specifically, in the MIB) is used to indicate the third parameter or other information.

In Rel-15 NR, the indication field subCarrierSpacing-Common is used to indicate subcarrier spacings (SCSs) for SIB1, paging, and/or other broadcast system information. However, in NR-U, it is not supported that SSBs and the above information adopt different SCSs. That is, the SSBs and the above information always use identical SCSs, and the terminal equipment may learn the SCSs of the above information according to the SCSs of the SSBs. Therefore, in NR-U, the indication field does not need to assume a role defined in Rel-15, and may use the indication field to indicate the above third parameter or other information. For example, the indication field may be used to indicate an LSB or MSB of the third parameter, and the terminal equipment determines the third parameter according to the LSB or MSB of the third parameter indicated by the indication field, and then determines the QCL relationship between SSBs.

In some embodiments, $\bar{a}_{\bar{A}+6}$ in the PBCH payload (more specifically, in the bits generated by the physical layer) is used to indicate the third parameter or other information.

In Rel-15 NR, the indication field $\bar{a}_{\bar{A}+6}$ is used to indicate an SSB index in FR2. However, currently, NR-U only supports FR1, and when the number of candidate SSBs is 10, this indication field is not needed to indicate the candidate SSB index. Therefore, in NR-U, when the number of the candidate SSBs is 10, the indication field may be used to indicate the above third parameter or other information. For example, the indication field may be used to indicate the above third parameter, and the terminal equipment determines the third parameter according to the indication field, and then determines the QCL relationship between SSBs. In the above and the following description, definitions of FR1 and FR2 are the same as those in the existing standards, and description thereof is omitted herein.

In some embodiments, at least one bit of pdcch-ConfigSIB1 in the PBCH payload (more specifically, in the MIB) is used to indicate the third parameter or other information.

In Rel-15 NR, the indication field pdcch-ConfigSIB1 is used to indicate CORESET #0 configuration. In NR-U, in order to meet spectrum regulatory requirements of unlicensed or shared spectrum/bands, CORESET #0 on a 20 MHz channel (including about 51 (SCS=30 kHz) and 106 (SCS=15 kHz) RBs) includes 48 (SCS=30 kHz) or 96 (SCS=15 kHz) RBs. Therefore, compared with Rel-15 NR, a position of CORESET #0 on the frequency domain in NR-U is more limited, it is not needed to use all bits in the indication field or all indices corresponding to the indication field to indicate the CORESET #0 configuration, and some bits in the indication field or a part of the indices corresponding to the indication field may be used to indicate the above third parameter or other information. For example, at least one bit of pdcch-ConfigSIB1 in the PBCH payload (more specifically, in the MIB) may be used to indicate the above third parameter, and the terminal equipment determines the third parameter according to the at least one bit, and then determines the QCL relationship between SSBs.

In some embodiments, at least one bit in $\bar{a}_{\bar{A}+5}$ in the PBCH payload (more specifically, in the bits generated by the physical layer) and/or in ssb-SubcarrierOffset in the PBCH payload (more specifically, in the MIB) is used to indicate the third parameter or other information.

In Rel-15 NR, for FR1, $\bar{a}_{\bar{A}+5}$ and ssb-SubcarrierOffset are used to indicate a value of $k_{SSB}$; and for FR2, $\bar{a}_{\bar{A}+5}$ is used to indicate the SSB index, and ssb-SubcarrierOffset is used to indicate the value of $k_{SSB}$. After receiving the SSB, the terminal equipment may determine whether the SSB has associated SIB1 according to the value of $k_{SSB}$ in the PBCH payload, and if there is no associated SIB1, it may further determine a frequency-domain position where an SSB associated with SIB1 is located or a frequency range of an SSB not associated with SIB1 according to the value of $k_{SSB}$ and pdcch-ConfigSIB1, so as to receive another SSB and SIB1 associated therewith.

In particular, the terminal equipment learns the value of $k_{SSB}$ according to ssb-SubcarrierOffset included in the MIB carried by the PBCH and $\bar{a}_{\bar{A}+5}$ included in the physical layer payload. For FR1, if $k_{SSB} \leq 23$, the terminal equipment determines that CORESET #0 exists, that is, the SSB where the PBCH is located has associated SIB1, and monitors a PDCCH used for scheduling a PDSCH carrying SIB1 according to information in MIB (such as pdcch-ConfigSIB1, etc.), and further receives SIB1. And if $k_{SSB} > 23$, the terminal equipment determines that CORESET #0 does not exist, that is, the SSB where the PBCH is located has no associated SIB1. Here, CORESET #0 is a CORESET for a Type0-PDCCH CSS set.

In an example, if the terminal equipment detects an SSB (referred to as a first SSB) and determines that CORESET #0 does not exist, and $24 \leq k_{SSB} \leq 29$, the terminal equipment may determine that a nearest frequency-domain position (or, in other words, a global synchronization channel number (GSCN)) of the SSB associated with SIB1 (referred to as a second SSB) is $$N_{GSCN}^{Reference} + N_{GSCN}^{Offset},$$

and further receive the second SSB at this frequency-domain position to receive SIB1; where, $$N_{GSCN}^{Reference}$$

is a GSCN of the first SSB, and $$N_{GSCN}^{Offset}$$

is a GSCN offset relative to $N_{GSCN}^{Reference}$ (which may be positive or negative), and is indicated by pdcch-ConfigSIB1.

If the terminal equipment detects a first SSB and determines that CORESET #0 does not exist and $k_{SSB}=31$, the terminal equipment may determine that there is no SSB associated with SIB1 within this GSCN range $$\left[N_{GSCN}^{Reference} - N_{GSCN}^{Start}, N_{GSCN}^{Reference} + N_{GSCN}^{End}\right].$$

$$N_{GSCN}^{Start}$$

and $$N_{GSCN}^{End}$$

are indicated by controlResourceSetZero and searchSpaceZero in pdcch-ConfigSIB1, respectively. In particular, if $$\left[N_{GSCN}^{Reference}, N_{GSCN}^{Reference}\right],$$

the terminal equipment may deem that there is no information on the SSB associated with SIB1. Table 0 below shows a correspondence between the value of $k_{SSB}$ and values of bits of the indication fields.

TABLE 0

| $k_{SSB}$ | $\overline{a}_{A+5}$ | ssb-SubcarrierOffset | | | | pdcch-ConfigSIB1 |
|---|---|---|---|---|---|---|
| 0 | 0 | 0 | 0 | 0 | 0 | indicate PDCCH occasion for PDCCH reception |
| 1 | 0 | 0 | 0 | 0 | 1 | |
| 2 | 0 | 0 | 0 | 1 | 0 | |
| 3 | 0 | 0 | 0 | 1 | 1 | |
| 4 | 0 | 0 | 1 | 0 | 0 | |
| 5 | 0 | 0 | 1 | 0 | 1 | |
| 6 | 0 | 0 | 1 | 1 | 0 | |
| 7 | 0 | 0 | 1 | 1 | 1 | |
| 8 | 0 | 1 | 0 | 0 | 0 | |
| 9 | 0 | 1 | 0 | 0 | 1 | |
| 10 | 0 | 1 | 0 | 1 | 0 | |
| 11 | 0 | 1 | 0 | 1 | 1 | |
| 12 | 0 | 1 | 1 | 0 | 0 | |
| 13 | 0 | 1 | 1 | 0 | 1 | |
| 14 | 0 | 1 | 1 | 1 | 0 | |
| 15 | 0 | 1 | 1 | 1 | 1 | |
| 16 | 1 | 0 | 0 | 0 | 0 | |
| 17 | 1 | 0 | 0 | 0 | 1 | |
| 18 | 1 | 0 | 0 | 1 | 0 | |
| 19 | 1 | 0 | 0 | 1 | 1 | |
| 20 | 1 | 0 | 1 | 0 | 0 | |
| 21 | 1 | 0 | 1 | 0 | 1 | |
| 22 | 1 | 0 | 1 | 1 | 0 | |
| 23 | 1 | 0 | 1 | 1 | 1 | |
| 24 | 1 | 1 | 0 | 0 | 0 | indicate GSCN value of CD-SSB |
| 25 | 1 | 1 | 0 | 0 | 1 | |
| 26 | 1 | 1 | 0 | 1 | 0 | |
| 27 | 1 | 1 | 0 | 1 | 1 | |
| 28 | 1 | 1 | 1 | 0 | 0 | |
| 29 | 1 | 1 | 1 | 0 | 1 | |
| 30 | 1 | 1 | 1 | 1 | 0 | reserve |
| 31 | 1 | 1 | 1 | 1 | 1 | indicate a range of GSCN where no CD-SSB is located |

However, in NR-U, the SCS of the SSB is always identical to the SCSs of such information as SIB1, etc., and $k_{SSB}$ may possibly not need to indicate whether the SSB has associated SIB. Compared with Rel-15 NR, a value of needed $k_{SSB}$ in NR-U is more limited, and it is not needed to use all bits in a corresponding indication field ($\bar{a}_{\bar{A}+5}$ and/or ssb-SubcarrierOffset) or all indices corresponding to the indication field to indicate the value of $k_{SSB}$. Therefore, some bits in the indication field or a part of the indices corresponding to the indication field may be used to indicate the above third parameter or other information. For example, at least one bit in $\bar{a}_{\bar{A}+5}$ in the PBCH payload (more specifically, in the bits generated by the physical layer) and/or in ssb-SubcarrierOffset in the PBCH payload (more specifically, in the MIB) may be used to indicate the above third parameter, and the terminal equipment determines the third parameter according to the at least one bit, and further determines the QCL relationship between SSBs.

A particular indication method for indicating $$N_{SSB}^{QCL}$$

via the above at least one indication field shall be illustrated below by taking that the third parameter is characterized by $$N_{SSB}^{QCL}$$

as an example.

In one example, it is assumed that a value range of $$N_{SSB}^{QCL}$$

is {1, 2, 4, 8}, which is indicated by subCarrierSpacing-Common and intraFreqReselection. A correspondence relationship between the value of the above indication field and the value of $$N_{SSB}^{QCL}$$

is shown in, for example, Table 1 or Table 2 below. In this example, subCarrierSpacingCommon may indicate an MSB or LSB of $$N_{SSB}^{QCL},$$

and correspondingly, intraFreqReselection may indicate the LSB or MSB of $$N_{SSB}^{QCL}.$$

TABLE 1

| subCarrierSpacingCommon | intraFreqReselection | $N_{SSB}{}^{QCL}$ |
|---|---|---|
| scs15or60 | allowed | 1 |
| scs15or60 | notAllowed | 2 |

TABLE 1-continued

| subCarrierSpacingCommon | intraFreqReselection | $N_{SSB}{}^{QCL}$ |
|---|---|---|
| scs30or120 | allowed | 4 |
| scs30or120 | notAllowed | 8 |

TABLE 2

| intraFreqReselection | subCarrierSpacingCommon | $N_{SSB}{}^{QCL}$ |
|---|---|---|
| allowed | scs15or60 | 1 |
| allowed | scs30or120 | 2 |
| notAllowed | scs15or60 | 4 |
| notAllowed | scs30or120 | 8 |

In another example, it is assumed that a value range of $$N_{SSB}^{QCL}$$

is {1, 2, 4, 8}, which is indicated by a bit (such as an LSB) in subCarrierSpacingCommon and ssb-SubcarrierOffset. A correspondence relationship between the value of the above indication field and the value of $$N_{SSB}^{QCL}$$

is shown in, for example, Table 3 or Table 4 below. In this example, subCarrierSpacingCommon may indicate an MSB or LSB of $$N_{SSB}^{QCL},$$

and correspondingly, the LSB in ssb-SubcarrierOffset may indicate the LSB or MSB of $$N_{SSB}^{QCL}.$$

The LSB of $$N_{SSB}^{QCL}$$

is a lowest binary bit in a binary form of $$N_{SSB}^{QCL},$$

and MSB of $$N_{SSB}^{QCL}$$

is a highest binary bit in the binary form of $$N_{SSB}^{QCL}.$$

TABLE 3

| subCarrierSpacingCommon | LSB of ssb-SubcarrierOffset | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

TABLE 4

| LSB of ssb-SubcarrierOffset | subCarrierSpacingCommon | $N_{SSB}^{QCL}$ |
|---|---|---|
| 0 | scs15or60 | 1 |
| 0 | scs30or120 | 2 |
| 1 | scs15or60 | 4 |
| 1 | scs30or120 | 8 |

In a further example, it is assumed that a value range of $$N_{SSB}^{QCL}$$

is {2, 4}, which is indicated by subCarrierSpacingCommon or intraFreqReselection. A correspondence relationship between the value of the above indication field and the value of $$N_{SSB}^{QCL}$$

is shown in, for example, Table 5 or Table 6 below.

TABLE 5

| subCarrierSpacingCommon | $N_{SSB}^{QCL}$ |
|---|---|
| scs15or60 | 2 |
| scs30or120 | 4 |

TABLE 6

| intraFreqReselection | $N_{SSB}^{QCL}$ |
|---|---|
| allowed | 2 |
| notAllowed | 4 |

The above examples are illustrative only, and in a specific implementation process, different methods may be used to indicate $$N_{SSB}^{QCL}$$

in different situations, which shall not be described herein any further.

In the embodiment of this disclosure, the value ranges of the third parameter may be different in different cases. Even in some cases, the PBCH may possibly not indicate the third parameter. Correspondingly, after receiving the SSB, the terminal equipment may need to determine whether its PBCH indicates the third parameter and/or the value range of the third parameter, and further receive SIB1 or other SSBs according to the information carried by the PBCH.

In some embodiments, as shown in FIG. 2, the method may further include:

202: the terminal equipment determines whether the physical broadcast channel included in the synchronization signal block indicates the third parameter and/or the value range of the third parameter.

In some embodiments, the terminal equipment determines whether the physical broadcast channel included in the synchronization signal block indicates the third parameter and/or the value range of the third parameter according to at least one of the following A, B and C.

A: whether the synchronization signal block has associated SIB1;

B: a frequency-domain position of the synchronization signal block; and

C: information carried by the synchronization signal block.

In some embodiments, whether the synchronization signal block has associated SIB1 may be determined according to at least one of B and C above.

For example, the terminal equipment may determine whether the synchronization signal block has associated SIB1 according to a frequency-domain position of the synchronization signal block.

In one example, if the synchronization signal block is located in an unlicensed spectrum/band or a shared spectrum/band, the terminal equipment always assumes that the synchronization signal block has associated SIB1, that is, for the unlicensed spectrum/band or shared spectrum/band, the terminal equipment always assumes that the SSB has associated SIB1.

In another example, if the synchronization block is not on a sync raster defined in NR-U, the synchronization block has no associated SIB1; and if the synchronization block is on the sync raster defined in NR-U, the synchronization signal block has associated SIB1.

In a further example, if the synchronization block is not on the sync raster defined in Rel-15 NR, the synchronization block has no associated SIB1; and if the synchronization block is on the sync raster defined in Rel-15 NR, the synchronization signal block has associated SIB1.

The above three examples are illustrative only, and this disclosure is not limited thereto. For a definition of the sync raster, reference may be made to related technologies, which shall not be described herein any further.

In an example, a mapping relationship between resource elements (REs) of the SSB and the sync raster where it is located is shown in Table 7 below and FIG. 3.

TABLE 7

| Resource element index k | 0 |
|---|---|
| Physical resource block number $n_{PRB}$ of the SS block | $n_{PRB} = 10$ |

For details, reference may be made to related technologies, which shall not be described herein any further.

In addition, regarding the relationship between the sync raster defined in NR-U and the sync raster defined in Rel-15

NR, taking the 5 GHz unlicensed spectrum/band as an example, channel division is shown in FIG. 4. According to the sync raster defined in Rel-15 NR, taking 5150~5170 MHz as an example, a frequency position of the sync raster in this frequency range and the corresponding GSCN are shown in FIG. 5. The same is true for other channels.

In NR-U, there is only 1 sync raster on each channel of 20 MHz. The sync raster is one of sync rasters in the corresponding frequency range defined in Rel-15 NR. Taking 5150~5170 MHz as an example, a frequency position of a sync raster within this frequency range is, for example, 5155.68 MHz (GSCN=8996), as shown in FIG. 6. The same is true for other channels.

The relationship between the sync raster defined in NR-U and the sync raster defined in Rel-15 NR is only described above in brief, and reference may be made to related technologies for details, which shall not be described herein any further.

For another example, the terminal equipment may determine whether the synchronization signal block has associated SIB1 according to the information carried by the synchronization signal block.

In one example, the terminal equipment determines whether the synchronization signal block has associated SIB1 according to the value of $k_{SSB}$ indicated by the synchronization signal block. Reference may be made to related technologies or the embodiment of the second aspect for a mode of indicating the value of $k_{SSB}$ by the synchronization signal block, which shall not be described herein any further.

In another example, the terminal equipment determines whether the synchronization signal block has associated SIB1 according to the MSB in ssb-SubcarrierOffset and $\bar{a}_{\bar{A}+5}$ in the payload of the physical broadcast channel included in the synchronization signal block. For example, when both MSB in ssb-SubcarrierOffset and $\bar{a}_{\bar{A}+5}$ are 1, the SSB has no associated SIB1; otherwise, the SSB has associated SIB1.

In a further example, the terminal equipment determines whether the synchronization signal block has associated SIB1 according to at least one bit in at least one of the following indication fields of the physical broadcast channel included in the synchronization signal block:

intraFreqReselection;

subCarrierSpacingCommon;

$\bar{a}_{\bar{A}+6}$;

pdcch-ConfigSIB1.

As described above, at least one bit of the at least one indication field above may be used to indicate the above third parameter, and may also be used to indicate other information. In this example, the at least one bit of the at least one indication field above may be used to indicate whether the synchronization block has associated SIB1.

The above three examples are illustrative only, and this disclosure is not limited thereto.

In some embodiments, the terminal equipment determines whether the physical broadcast channel included in the synchronization signal block indicates the third parameter according to whether the synchronization signal block has associated SIB1, which may be:

if the synchronization signal block has no associated SIB1, it is determined that the physical broadcast channel included in the synchronization signal block does not indicate the third parameter; and if the synchronization signal block has associated SIB1, it is determined that the physical broadcast channel included in the synchronization signal block indicates the third parameter.

In some embodiments, the terminal equipment determines the value range of the third parameter according to whether the synchronization signal block has associated SIB1, which may be:

if the synchronization signal block has no associated SIB1, it is determined that the value range of the third parameter is a first range, such as {2, 4}; and if the synchronization signal block has associated SIB1, it is determined that the value range of the third parameter is a second range, such as {1, 2, 4, 8}.

In some embodiments, the terminal equipment determines whether the physical broadcast channel included in the synchronization signal block indicates the third parameter according to the frequency-domain position of the synchronization signal block, which may be:

if the synchronization signal block is not on the sync raster defined in NR-U, it is determined that the physical broadcast channel included in the synchronization signal block does not indicate the third parameter; and if the synchronization signal block is on the sync raster defined in NR-U, it is determined that the physical broadcast channel included in the synchronization signal block indicates the third parameter.

In some embodiments, the terminal equipment determines whether the physical broadcast channel included in the synchronization signal block indicates the third parameter according to the frequency-domain position of the synchronization signal block, which may be:

if the synchronization signal block is not on the sync raster defined in Rel-15 NR, it is determined that the physical broadcast channel included in the synchronization signal block does not indicate the third parameter; and if the synchronization signal block is on the sync raster defined in Rel-15 NR, it is determined that the physical broadcast channel included in the synchronization signal block indicates the third parameter.

In some embodiments, the terminal equipment determines the value range of the third parameter according to the frequency-domain position of the synchronization signal block, which may be:

if the synchronization signal block is not on the sync raster defined in NR-U, it is determined that the value range of the third parameter is a first range, such as {2, 4}; and if the synchronization signal block is on the sync raster defined in NR-U, it is determined that the value range of the third parameter is a second range, such as {1, 2, 4, 8}.

In some embodiments, the terminal equipment determines the value range of the third parameter according to the frequency-domain position of the synchronization signal block, which may be:

if the synchronization signal block is not on the sync raster defined in Rel-15 NR, it is determined that the value range of the third parameter is a first range, such as {2, 4}; and if the synchronization signal block is on the sync raster defined in Rel-15 NR, it is determined that the value range of the third parameter is a second range, such as {1, 2, 4, 8}.

What described above is illustrative only, and this disclosure is not limited thereto. Reference may be made to related technologies for a definition of the sync raster, which shall not be described herein any further. In addition, a positional relationship between the RE of the SSB and the sync raster where it is located and a relationship between the sync raster defined in NR-U and the sync raster defined in Rel-15 NR have been briefly explained above, and shall not be described herein any further.

In some embodiments, the terminal equipment determines whether the physical broadcast channel included in the synchronization signal block indicates the third parameter and/or the value range of the third parameter according to the information carried by the synchronization signal block, which may be that:

the terminal equipment determines whether the physical broadcast channel included in the synchronization signal block indicates the third parameter and/or the value range of the third parameter according to information other than bits, which are possibly used to indicate the third parameter, in the information carried by the synchronization signal block. For example, the information carried by the synchronization signal block refers to a bit other than bits, which are possibly used to indicate the third parameter, in the at least one indication field (intraFreqReselection, subCarrierSpacing-Common, $\bar{a}_{\bar{A}+6}$, pdcch-ConfigSIB1, $\bar{a}_{\bar{A}+5}$ and ssb-Subcarrier-Offset) in the payload of the physical broadcast channel in the synchronization signal block. As described above, in addition to indicating the third parameter, the at least one indication field may also indicate other information, the other information, for example, being able to be used to indicate whether the physical broadcast channel included in the synchronization signal block indicates the third parameter and/or value range of the third parameter.

In some embodiments, as shown in FIG. 2, the method may further include:

203: the terminal equipment determines an indication field for indicating the third parameter according to the value range of the third parameter.

For example, if the value range of the third parameter is a first range (such as {2, 4}), the terminal equipment determines that the indication field used to indicate the third parameter is subCarrierSpacingCommon or intraFreqReselection, that is, for example, the third parameter may be indicated in the mode in the above Table 5 or Table 6; and if the value range of the third parameter is a second range (such as {1, 2, 4, 8}), the terminal equipment determines that the indication field used to indicate the third parameter is subCarrierSpacingCommon and intraFreqReselection, that is, for example, the third parameter may be indicated in a mode in any one of above tables 1-4.

What described above is illustrative only; however, this disclosure is not limited thereto, and other modes may also be used to determine the indication field used to indicate the third parameter.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that for an unlicensed or shared spectrum/band, indicating the QCL relationship between SSBs (such as indicating the third parameter) by reusing the bits in the indication fields in the PBCH payload defined in Rel-15 NR is supported.

EMBODIMENT OF A SECOND ASPECT

As described in the embodiment of the first aspect, NR-U may use the bits in the indication field (including $\bar{a}_{\bar{A}+5}$ and ssb-SubcarrierOffset) used for indicating $k_{SSB}$ defined in Rel-15 NR to indicate the third parameters or other information. In this case, if the terminal equipment still determines the value of $k_{SSB}$ according to the method in Rel-15 NR, the value range of $k_{SSB}$ will be limited by the value indicated by the third parameter or other information, thereby limiting flexibility of deployment of the network, even causing that the value range of $k_{SSB}$ is unable to meet actual demands of deployment of the network.

For example, if the LSB in ssb-SubcarrierOffset is used to indicate the third parameter, the correspondence relationship between the value of the LSB in ssb-SubcarrierOffset and the value of the third parameter (such as $$N_{SSB}^{QCL}$$

) is as shown in Table 3 above, and when the third parameter is 2 or 8, it is needed to set the LSB in ssb-SubcarrierOffset to be 1. If the method in Rel-15 NR is used, the terminal equipment will determine the value of $k_{SSB}$ according to the LSB in ssb-SubcarrierOffset, and as the LSB in ssb-SubcarrierOffset is set to be 1, the value of $k_{SSB}$ may only be an odd number, but the actual demands of the deployment of the network may possibly need to support that $k_{SSB}$ is able to be an even number.

At least for the above problems, the embodiment of this disclosure provides a system information reception method, which shall be described from a terminal equipment side. The embodiment of this disclosure may be implemented in combination with the embodiment of the first aspect, or may be implemented separately, with contents identical to those in the embodiment of the first aspect being not going to be described herein any further.

FIG. 7 is a schematic diagram of the system information reception method of the embodiment of this disclosure. As shown in FIG. 7, the method includes:

701: a terminal equipment receives a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{A}+5}$ in a physical broadcast channel payload contained in the first synchronization signal block being used for indicating a QCL relationship between SSBs or being not used for indicating a first parameter;

702: the terminal equipment determines the first parameter according to the first synchronization signal block, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and

703: the terminal equipment receives the SIB1, associated with the first synchronization signal block, or a second synchronization signal block according to the first parameter.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In the embodiment of this disclosure, bits in $\bar{a}_{\bar{A}+5}$ and/or ssb-SubcarrierOffset in the PBCH payload that are used to indicate the QCL relationship between SSBs and/or not used to indicate the first parameter are referred to as a first bit. The first bit includes at least one bit, and in some embodiments, the first bit is an LSB in ssb-SubcarrierOffset; however, this disclosure is not limited thereto.

In the embodiment of this disclosure, in 701, the phrase "used to indicate" means that:

if this bit is used to indicate the QCL relationship between SSBs (such as indicating the third parameter), the terminal equipment needs to determine the QCL relationship between SSBs (or the third parameter) according to a value of this bit in the received PBCH payload; otherwise, the terminal equipment does not determine the QCL relationship between SSBs (or the third parameter) according to the value of the bit in the received PBCH payload; and if this bit is used to indicate the first parameter, the terminal equipment needs to determine the first parameter according to the value of the bit in the received PBCH payload; otherwise, the terminal equipment does not determine the first parameter according to the value of the bit in the received PBCH payload; for example, the terminal equipment determines the value of the first parameter by assuming the value of the bit or a value of a binary bit corresponding to the bit, while ignoring the value of the bit in the PBCH payload.

In the embodiment of this disclosure, "used to indicate the QCL relationship between SSBs and/or not used to indicate the first parameter" includes the following cases that:

used to indicate the QCL relationship between SSBs and used to indicate the first parameter;

used to indicate the QCL relationship between SSBs but not used to indicate the first parameter; and not used to indicate the QCL relationship between SSBs and not used to indicate the first parameter.

In the embodiment of this disclosure, in 702, determining the first parameter according to the first synchronization signal block refers to that: the terminal equipment determines the first parameter according to the information carried by the first synchronization signal block.

In the embodiment of this disclosure, in the above and the following descriptions, unless otherwise specified, the information carried (or indicated) by the first synchronization signal block includes information carried by a PSS/SSS/PBCH/PBCH DMRS included in the first synchronization signal block, such as information carried by the PSS/SSS/PBCH DMRS via a sequence, or, bits in the PBCH payload, etc.

In some embodiments, similar to the embodiment of the first aspect, the first bit may indicate the QCL relationship between SSBs by indicating the third parameter, and the specific indicating method has been described in the embodiment of the first aspect, and shall not be described herein any further. And the third parameter may be characterized by Q, and may also be characterized by other signs.

In some embodiments, the above first parameter is characterized by $k_{SSB}$; however, this disclosure is not limited thereto, and the above first parameter may also be characterized by other signs. The terminal equipment may determine a position of a CORESET for monitoring or receiving a PDCCH according to $k_{SSB}$, the PDCCH being used to schedule a PDSCH carrying SIB1 associated with the first synchronization signal block; and/or, the terminal equipment may determine that the first synchronization signal block has no associated SIB1 according to $k_{SSB}$.

In some embodiments, in 702, for an unlicensed spectrum/band or a shared spectrum/band, and/or if a first bit in ssb-SubcarrierOffset and/or $\bar{a}_{\bar{A}+5}$ in the payload of the physical broadcast channel included in the first synchronization signal block is used to indicate the QCL relationship between SSBs and/or is not used to indicate the first parameter, the terminal equipment may assume (or determine) that a value of the first bit is 0 or 1, or, assume that a value of a binary bit of the first parameter corresponding to the first bit is 0 or 1, and further determines the first parameter according to the assumed value of the first bit or the assumed value of the binary bit of first parameter corresponding to the first bit.

A correspondence relationship between the first bit and the binary bit of the first parameter is, for example, as shown in Table 0 in the embodiment of the first aspect.

For example, if the first bit is an LSB in ssb-Subcarrier-Offset, the binary bit of the first parameter corresponding to the first bit is an LSB of the first parameter in a binary form (which may also be briefly referred to as an LSB of the first parameter).

For another example, if the first bit is 2 LSBs in ssb-SubcarrierOffset, the binary bit of the first parameter corresponding to the first bit is 2 LSBs of the first parameter in a binary form (which may also be briefly referred to as 2 LSBs of the first parameter).

That is, in determining the value of the first parameter, the terminal equipment ignores the value of the first bit in $\bar{a}_{\bar{A}+5}$ and/or ssb-SubcarrierOffset in the payload of the physical broadcast channel included in the received first synchronization signal block used to indicate the QCL relationship between SSBs and/or not used to indicate the first parameter. That is, the terminal equipment does not determine the value of the first parameter according to the first bit in the received PBCH payload. For example, if the terminal equipment assumes that the value of the first bit is 0 in determining the first parameter, even if the first bit in the received PBCH payload is 1, the terminal equipment still deems that the first bit is 0 in determining the value of the first parameter.

Indicating the QCL relationship between SSBs by indicating the third parameter is still taken as an example. For example, if the LSB in ssb-SubcarrierOffset in the PBCH payload is used to indicate the third parameter, in determining the value of the first parameter (such as $k_{SSB}$), the terminal equipment assumes that the LSB in ssb-SubcarrierOffset is 0 or 1 (or assumes that the LSB of $k_{SSB}$ is 0 or 1), and ignores the value of the LSB in ssb-SubcarrierOffset in the received PBCH payload.

In the above embodiment, if the terminal equipment always assumes that the LSB in ssb-SubcarrierOffset is 0 or 1 (or in other words, the LSB of the first parameter is 0 or 1) in determining the value of the first parameter, correspondingly, it will not be supported that the first parameter is of an odd number or an even umber. However, considering actual demands of deployment of the network, the value range of the first parameter may need to include both even numbers and odd numbers. In some embodiments, the terminal equipment may determine whether the value of the first bit is 0 or 1 according to information other than the first bit carried in the first synchronization signal block. And in some embodiments, the terminal equipment may determine whether the value of the binary bit corresponding to the first bit of the first parameter is 0 or 1 according to the information other than the first bit carried in the first synchronization signal block.

For example, in determining the value of the first parameter, the terminal equipment may adopt a certain method to assume whether the LSB in ssb-SubcarrierOffset (or, in other words, to determine whether the LSB of the first parameter) is 0 or 1. For example, the terminal equipment assumes the value of the LSB in ssb-SubcarrierOffset (or, in other words, to determine the value of the LSB of the first parameter) according to other bit information (other information than the LSB in ssb-SubcarrierOffset) carried in the first synchronization signal block and/or the PBCH included therein (referred to as an SSB/PBCH in brief).

For example, a value of the LSB in ssb-SubcarrierOffset is assumed (or, in other words, the value of the LSB of the first parameter value is determined) according to x (x=<3) MSB(s) in ssb-SubcarrierOffset and/or $\bar{a}_{\bar{A}+5}$. In particular, for example, assuming that a value range of the first parameter to be supported is an even number less than 30, and 31, if 3 MSBs in ssb-SubcarrierOffset and $\bar{a}_{\bar{A}+5}$ are both 1, the value of the LSB in ssb-SubcarrierOffset (or, in other words, the value of the LSB of the first parameter) is 1; otherwise, the value is 0. For another example, assuming that the value range of the first parameter is an even number less than 24 and an odd number greater than 24, when the MSB in ssb-SubcarrierOffset and $\bar{a}_{\bar{A}+5}$ are both 1, the value of the LSB in ssb-SubcarrierOffset (or, in other words, the value of the LSB of the first parameter) is 1; otherwise, the value is 0.

In some embodiments, in 702, for the unlicensed spectrum/band or the shared spectrum/band, and/or if the first bit in ssb-SubcarrierOffset and/or $\bar{a}_{\bar{A}+5}$ in the physical broadcast channel payload contained in the first synchronization signal block is used for indicating a QCL relationship between SSBs or are not used for indicating the first parameter, the terminal equipment determines the first parameter according only to bits in ssb-SubcarrierOffset and/or $\bar{a}_{\bar{A}+5}$ in the physical broadcast channel payload contained in the first synchronization signal block other than the first bit.

For example, the LSB in ssb-SubcarrierOffset is used to indicate the QCL relationship between SSBs, and the terminal equipment determines the value of the first parameter according only to a bit in 3 MSBs (i.e. a 1st MSB, a 2nd MSB and a 3rd MSB) in ssb-SubcarrierOffset and $\bar{a}_{\bar{A}+5}$, wherein 1 bit of 3 MSBs in ssb-SubcarrierOffset or $\bar{a}_{\bar{A}+5}$ is used to indicate the LSB of the first parameter.

Taking that the first parameter is $k_{SSB}$ as an example, a correspondence relationship between the value of $k_{SSB}$ and the values of 3 MSBs in ssb-SubcarrierOffset and $\bar{a}_{\bar{A}+5}$ is shown in a table below.

| $k_{SSB}$ | $\bar{a}_{\bar{A}+5}$ | 3 MSBs of ssb-SubcarrierOffset |
|---|---|---|
| 0 | 0 | 000 |
| 1 | 0 | 001 |
| 2 | 0 | 010 |
| 3 | 0 | 011 |
| 4 | 0 | 100 |
| 5 | 0 | 101 |
| 6 | 0 | 110 |
| 7 | 0 | 111 |
| 8 | 1 | 000 |
| 9 | 1 | 001 |
| 10 | 1 | 010 |
| 11 | 1 | 011 |
| 12 | 1 | 100 |

-continued

| $k_{SSB}$ | $\bar{a}_{\bar{A}+5}$ | 3 MSBs of ssb-SubcarrierOffset |
|---|---|---|
| 13 | 1 | 101 |
| 14 | 1 | 110 |
| 15 | 1 | 111 |

In the embodiment of the second aspect of this disclosure, only part of the values in the value range of the first parameter able to be indicated by the bit used to indicate the first parameter are valid. For example, the range able to be indicated is {0, 1, 2, . . . 15}, but only values in {0, 1, 2, . . . 11} or in {0, 1, 2, . . . 12} are valid. The terminal equipment does not expect that the value of the first parameter indicated by the bit for indicating the first parameter is not within the valid value range, or, in other words, the terminal equipment does not expect that the value of the first parameter indicated by the bit for indicating the first parameter is invalid.

In some embodiments, in 702, for the unlicensed spectrum/band or the shared spectrum/band, and/or if the first bit in ssb-SubcarrierOffset and/or $\bar{a}_{\bar{A}+5}$ in the physical broadcast channel payload contained in the first synchronization signal block is used for indicating a QCL relationship between SSBs and/or are not used for indicating the first parameter, the terminal equipment determines the first parameter according to information carried by the first synchronization signal block other than "bits in ssb-SubcarrierOffset and/or $\bar{a}_{\bar{A}+5}$ in the physical broadcast channel payload contained in the first synchronization signal block".

For example, the terminal equipment may determine the value of the first parameter (specifically, for example, the value of the LSB of $k_{SSB}$) according to a bit other than the bits in ssb-SubcarrierOffset and $\bar{a}_{\bar{A}+5}$ in the payload of the physical broadcast channel. The bit is, for example, one or more bits in at least one of the following indication fields:

intraFreqReselection;

$\bar{a}_{\bar{A}+6}$; and pdcch-ConfigSIB1.

In some embodiments, as shown in FIG. 7, before determining the above first parameter, the method further includes:

704: the terminal equipment determines a type of information indicated by the first bit in $\bar{a}_{\bar{A}+5}$ and/or ssb-SubcarrierOffset in the physical broadcast channel payload contained in the first synchronization signal block.

In some cases, for example, when the above first synchronization signal block has no associated SIB1, the PBCH included in the first synchronization signal block may not necessarily indicate the third parameter (for determining the QCL relationship between SSBs). Or, under different situations, value ranges of the third parameter may be different. Or, in different situations, value ranges of the first parameter may be different. Therefore, the type of information indicated by the first bit in $\bar{a}_{\bar{A}+5}$ and/or ssb-SubcarrierOffset may be different in different situations, that is, they may indicate the first parameter (e.g. $k_{SSB}$), or they may indicate the third parameter (e.g. Q), or they may indicate both the first parameter (e.g. $k_{SSB}$) and the third parameter (e.g. Q).

Hence, in 704, the terminal equipment may first determine the type of information indicated by the first bit, that is, the first parameter and/or the third parameter, or, in other words, the terminal equipment may determine whether the first bit is used to indicate the first parameter and/or third parameter.

In some embodiments, the terminal equipment determines the type of information indicated by the first bit according to bits other than the first bit carried in the first synchronization signal block.

Taking the LSB in the ssb-SubcarrierOffset as the above first bit as an example, according to other bit information (other than the LSB in ssb-SubcarrierOffset) carried in the first synchronization signal block, the terminal equipment may determine a type of information indicated by the LSB in ssb-SubcarrierOffset.

For example, the terminal equipment may determine the type of information indicated by the LSB in ssb-SubcarrierOffset according to the MSB in ssb-SubcarrierOffset and $\bar{a}_{\bar{A}+5}$. For example, when the MSB in ssb-SubcarrierOffset and $\bar{a}_{\bar{A}+5}$ are both 1, the LSB in ssb-SubcarrierOffset is used to indicate the first parameter (used or not used to indicate the third parameter), and the terminal equipment determines the value of the first parameter according to the value of the LSB in actual ssb-SubcarrierOffset; otherwise, the LSB in ssb-SubcarrierOffset is not used to indicate the first parameter (used or not used to indicate the third parameter), and the value of the first parameter may be determined according to the method described above. The same is true for the third parameter, for example, when the MSB in ssb-SubcarrierOffset and $\bar{a}_{\bar{A}+5}$ are both 1, the LSB in ssb-SubcarrierOffset is not used to indicate the third parameter, and the terminal equipment determines the value of the third parameter in the method of Table 1 or 2 or 5 or 6 in the embodiment of the first aspect, or in the method of Table 3 or 4 in the embodiment of the first aspect and by assuming that the value of the LSB in ssb-SubcarrierOffset (or the bits of its corresponding third parameter) is 0 or 1. Otherwise, the LSB in ssb-SubcarrierOffset is used to indicate the third parameter, and the value of the third parameter may be determined according to a value of an LSB in actual ssb-SubcarrierOffset and in the method in Table 3 or Table 4 in the embodiment of the first aspect.

In some embodiments, the terminal equipment determines the type of information indicated by the first bit according to whether the first synchronization signal block has associated SIB1.

Still taking that the LSB in ssb-SubcarrierOffset is the above first bit as an example, the terminal equipment may determine the type of information indicated by the LSB in ssb-SubcarrierOffset according to whether the first synchronization signal block has associated SIB1 (or, in other words, whether it is a CD-SSB). For example, when the first synchronization signal block has no associated SIB1 (or, in other words, it is not a CD-SSB), the LSB in ssb-SubcarrierOffset is used to indicate the first parameter, and the terminal equipment determines the value of the first parameter according to the value of the LSB in the actual ssb-SubcarrierOffset; otherwise, the LSB in the actual ssb-SubcarrierOffset is not used to indicate the first parameter, and in such a case, the value of the first parameter may be determined according to the method described above.

In some embodiments, similar to the method for determining "whether the synchronization signal block has associated SIB1" in the embodiment of the first aspect, whether the first synchronization signal block has associated SIB1 may be determined according to at least one of D and E below.

D: a frequency-domain position of the first synchronization signal block; and

E: information carried by the first synchronization signal block.

For example, the terminal equipment may determine whether the first synchronization signal block has associated SIB1 according to the frequency-domain position of the first synchronization signal block.

For another example, the terminal equipment may determine whether the synchronization signal block has associated SIB1 according to the information carried by the first synchronization signal block.

As the method for determining has been illustrated in detail in the embodiment of the first aspect, it shall not be described herein any further.

In some embodiments, in 703, the terminal equipment receives SIB1 associated with the first synchronization signal block according to the first parameter, which may be: the terminal equipment determines an offset between the first synchronization signal block and a common resource block (CRB) grid according to the first parameter, and receives the SIB1 associated with the first synchronization signal block according to the offset.

In some embodiments, the terminal equipment determines the above offset according to the first parameter and a reference subcarrier spacing. For example, the offset may be equal to a product of the first parameter and a granularity indicated by the first parameter, the granularity indicated by the first parameter may be a reference subcarrier spacing. That is, the above offset includes a first parameter number of reference subcarrier spacings. In some embodiments, the reference subcarrier spacing may be a subcarrier spacing of the first synchronization signal block or the CORESET, or a predefined subcarrier spacing, such as 15 kHz, or 30 kHz, etc., which is not limited in this disclosure.

In some embodiments, the terminal equipment determines the above offset according to the first parameter, the reference subcarrier spacing and a second factor. For example, the offset may be equal to the product of the first parameter and the granularity indicated by the first parameter, and the granularity indicated by the first parameter may also be a product of the reference subcarrier spacing and the second factor. For another example, the offset may be equal to a product of the first parameter, the granularity indicated by the first parameter and the second factor, and the granularity indicated by the first parameter may be a reference subcarrier spacing. A definition of the reference subcarrier spacing is the same as that described above, which shall not be described herein any further.

For example, when the value of the first parameter is within a certain range, such as $\{0, 1, 2, \ldots 11\}$, the terminal equipment determines the offset between the SSB and the CRB grid according to the first parameter, i.e. an offset or interval between a first subcarrier of the SSB and a first subcarrier of a first CRB overlapping with the SSB (i.e. a CRB with a smallest RB index overlapping with the SSB), and the terminal equipment receives SIB1 associated with the SSB according to the offset. FIG. 8 is a schematic diagram of the offset, wherein it is assumed that subcarrier spacings of the SSB and CRB (or CORESET #0) are all 30 kHz.

In some embodiments, the terminal equipment does not expect that the value of the first parameter is not within a range for determining a position of the CORESET (or, in other words, for determining the offset). For example, when the terminal equipment always assumes that the first synchronization signal block has associated SIB1, the terminal equipment does not expect that the value of the first parameter is not within the range for determining the position of the CORESET (or, in other words, for determining the offset).

In some embodiments, if the value of the first parameter is not within the range for determining the position of the CORESET (or for determining the offset), the terminal equipment deems that the first synchronization signal block has no associated SIB1, and does not receive SIB1 not associated with the first synchronization block.

In some embodiments, as shown in FIG. 7, before receiving SIB1, the method further includes:

705: the terminal equipment determines whether to receive SIB1 according to whether the first synchronization signal block has associated SIB1 and/or a type of SIB1 associated with the first synchronization signal block.

In the embodiment of this disclosure, if the first synchronization signal block has associated SIB1, the terminal equipment may receive SIB1 according to the information carried by the first synchronization signal block (such as the above determined first parameter); and if the first synchronization signal block has no associated SIB1, the terminal equipment may receive another SSB (such as a second synchronization signal block) according to information carried by the first synchronization signal block.

In some embodiments, a frequency-domain position of the second synchronization signal block is different from a frequency-domain position of the first synchronization signal block.

In some embodiments, the terminal equipment determines whether to receive SIB1, that is, whether to receive or not to receive SIB1 associated with the first synchronization block, according to whether the first synchronization signal block has associated SIB1 and/or a type of SIB1 associated with the first synchronization signal block.

In some embodiments, a type of SIB1 may be divided according to contents included therein and/or uses thereof.

For example, if the division is performed according to the contents, the SIB1 may be divided into two types, a first type is that SIB1 does not include servingCellConfigCommon, for example, it includes only cellAccessRelatedInfo; and a second type is, for example, that SIB1 includes servingCellConfigCommon.

For another example, if the division is performed according to the uses, the SIB1 may be divided into two types, a first type is that the SIB1 does not support initial access, for example, it only supports a UE to obtain CGI information of a corresponding cell; and a second type is, for example, it supports initial access.

The above division methods are illustrative only, and this disclosure is not limited thereto.

In some embodiments, similar to the method for determining "whether the synchronization signal block has associated SIB1" in the embodiment of the first aspect, the terminal equipment may determine whether the first synchronization signal block has associated SIB1 and/or a type of SIB1 associated with the first synchronization block according to at least one of D and E below:

D: a frequency-domain position of the first synchronization signal block; and

E: information carried by the first synchronization signal block.

In some embodiments, that the terminal equipment determines whether the first synchronization signal block has associated SIB1 and/or a type of SIB1 associated with the first synchronization block according to the frequency-domain position of the first synchronization signal block includes that: if the first synchronization signal block is at an unlicensed spectrum/band or a shared spectrum/band, the terminal equipment always assumes that the first synchronization signal block has associated SIB1, and determines the type of SIB1 associated with the first synchronization signal block according to whether the first synchronization signal block is on the sync raster defined in NR-U.

That is, for the unlicensed/shared spectrum/band, the terminal equipment always assumes that the first synchronization signal block has associated SIB1. Furthermore, the terminal equipment may determine the type of SIB1 according to whether the first synchronization signal block is on the sync raster defined in NR-U. For example, if the first synchronization signal block is on the sync raster defined in NR-U, it is deemed as being of the second type; otherwise, it is deemed as being of the first type. For another example, if the first synchronization signal block is on the sync raster defined in NR-U, it is deemed as being of the second type, and if it is on the sync raster defined in Rel-15 NR but not on the sync raster defined in NR-U, it is deemed as being of the first type.

In some embodiments, that the terminal equipment determines whether the first synchronization signal block has associated SIB1 and/or a type of SIB1 associated with the first synchronization block according to the frequency-domain position of the first synchronization signal block includes that: if the first synchronization signal block is not on the sync raster defined in NR-U, the first synchronization signal block does not have associated SIB1; and if the first synchronization signal block is on the sync raster defined in NR-U, the first synchronization signal block has associated SIB1.

In some embodiments, that the terminal equipment determines whether the first synchronization signal block has associated SIB1 and/or a type of SIB1 associated with the first synchronization block according to the frequency-domain position of the first synchronization signal block includes that: if the first synchronization signal block is not on the sync raster defined in Rel-15 NR, the first synchronization signal block has no associated SIB1; and if the first synchronization signal block is on the sync raster defined in Rel-15 NR, the first sync signal block has associated SIB1. Furthermore, the terminal equipment may determine the type of SIB1 according to whether the first synchronization signal block is on the sync raster defined in NR-U. For another example, if the first synchronization signal block is on the sync raster defined in NR-U, it is deemed as being of the second type, and if it is on the sync raster defined in Rel-15 NR but not on the sync raster defined in NR-U, it is deemed as being of the first type.

In some embodiments, that the terminal equipment determines whether the first synchronization signal block has associated SIB1 and/or a type of SIB1 associated with the first synchronization block according to the information carried by the first synchronization signal block includes that: the terminal equipment determines whether the first synchronization signal block has associated SIB1 and/or the type of the SIB1 associated with the first synchronization signal block according to the first parameter. If the value of the first parameter is not within the range for determining the position of the CORESET (or for determining the above offset), the terminal equipment deems that the first synchronization signal block has no associated SIB1.

In some embodiments, that the terminal equipment determines whether the first synchronization signal block has associated SIB1 and/or a type of SIB1 associated with the first synchronization block according to the information carried by the first synchronization signal block includes that: the terminal equipment determines whether the first synchronization signal block has associated SIB1 and/or the type of SIB1 associated with the first synchronization signal block according to the MSB in ssb-SubcarrierOffset and $\overline{a}_{\overline{A}+5}$ in the payload of the physical broadcast channel included in the first synchronization signal block. For example, when both the MSB in ssb-SubcarrierOffset and $\overline{a}_{\overline{A}+5}$ are 1, the first synchronization signal block has no associated SIB1; otherwise, the first synchronization signal block has associated SIB1.

In some embodiments, that the terminal equipment determines whether the first synchronization signal block has associated SIB1 and/or a type of SIB1 associated with the first synchronization block according to the information carried by the first synchronization signal block includes that: the terminal equipment determines whether the first synchronization signal block has associated SIB1 and/or the type SIB1 associated with the first synchronization signal block according to at least one of the following indication fields of the physical broadcast channel included in the first synchronization signal block:

intraFreqReselection;

subCarrierSpacingCommon;

$\overline{a}_{\overline{A}+6}$;

pdcch-ConfigSIB1.

As described in the embodiment of the first aspect, the above indication field may be used to indicate the QCL relationship between SSBs, such as by indicating the third parameter (Q) to indicate the QCL relationship between SSBs, and furthermore, the above indication field may also indicate other information, such as the information "whether the first synchronization signal block has associated SIB1 and/or the type of SIB1 associated with the first synchronization signal block", and the terminal equipment may determine whether the first synchronization signal block has associated SIB1 and/or the type of SIB1 associated with the first synchronization signal block according to the information. A particular indication method is not limited in this disclosure.

In the above embodiment, the "information carried by the first synchronization signal block" has been described above, and the contents thereof are incorporated herein, which shall not be described herein any further.

In some embodiments, if the above first synchronization signal block has no associated SIB1, the terminal equipment does not receive SIB1, and the terminal equipment may determine a frequency-domain position of a second synchronization block associated with SIB1 or a frequency range of the first synchronization signal block not associated with SIB1 according to the sync raster defined in NR-U.

In the above embodiment, if the first synchronization signal block has no associated SIB1, the PBCH included in the first synchronization signal block may further indicate the frequency-domain position of the SSB (the second synchronization signal block) associated with SIB1 or the frequency range of the SSB (the first synchronization signal block) not associated with SIB1. However, unlike the existing technologies, as the number of the sync rasters defined in NR-U is much smaller than the number of the sync rasters defined in Rel-15 NR, the frequency-domain position of the SSB (the second synchronization signal block) associated with SIB1 or the frequency range of the SSB (the first synchronization signal block) not associated with SIB1 may be indicated based on the sync rasters defined in NR-U, thereby greatly reducing bits needed in indicating this information, and the saved bits may also be used to indicate other information, such as indicating the above third parameter, and further indicating the QCL relationship between SSBs.

In some embodiments, if the first synchronization signal block has associated SIB1, the terminal equipment may determine whether to receive SIB1 according to at least one of the following that:

for cell selection or cell reselection, if the type of SIB1 associated with the first synchronization signal block is of the first type, the terminal equipment does not receive SIB1 associated with the first synchronization signal block; and for cell global identifier (CGI) report, the terminal equipment receives SIB1 associated with the first synchronization signal block.

In the above embodiments, in the case where the first synchronization signal block has associated SIB1, the terminal equipment may further determine whether to receive SIB1 associated with the first synchronization signal block. For example, for cell selection/reselection (e.g. if the terminal equipment is in an RRC_IDLE or RRC_INACTIVE state, or if the terminal equipment is in an RRC_CON-NECTED state but timer T311 is running), if the type of SIB1 associated with the first synchronization signal block is of the first type, the terminal equipment does not receive SIB1 associated with the first synchronization signal block. And for the CGI report, the terminal equipment receives the SIB1 associated with the first synchronization signal block. It should be noted that FIG. 7 only schematically illustrates the embodiment of this disclosure;

however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that for an unlicensed or shared spectrum, indicating the QCL relationship between SSBs (such as indicating the third parameter) or other information by reusing the bits in the indication fields in the PBCH payload defined in Rel-15 NR is supported, while eliminating or avoiding effects on other necessary or important information as possible, so that the system may operate normally and efficiently.

EMBODIMENT OF A THIRD ASPECT

The embodiment of this disclosure provides a system information reception method, which shall be described from a terminal equipment side. Problems to be solved by the embodiment of this disclosure may refer to the embodiment of the second aspect, and furthermore, this embodiment may be implemented in combination with the embodiments of the first and second aspects, or may be implemented separately, with contents identical to those in the embodiments of the first and second aspects being not going to be described herein any further.

FIG. 9 is another schematic diagram of the system information reception method of the embodiment of this disclosure. As shown in FIG. 9, the method includes:

901: a terminal equipment receives a first synchronization signal block (SSB) transmitted by a network device;

902: the terminal equipment determines a second parameter according to the first synchronization signal block;

903: the terminal equipment determines a first parameter according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and

904: the terminal equipment receives SIB1, associated with the first synchronization signal block, or a second synchronization signal block according to the first parameter.

In some embodiments, the first parameter or the second parameter may be characterized by $k_{SSB}$; however, this disclosure is not limited thereto, and the first parameter and the second parameter may also be characterized by other signs.

In some embodiments, a frequency-domain position of the second synchronization signal block is different from a frequency-domain position of the first synchronization signal block.

In some embodiments, in 902, the second parameter is determined in the method for determining $k_{SSB}$ in Rel-15 NR, and reference may be made to related techniques for a particular method for determination, which shall not be described herein any further.

In some embodiments, in 902, the second parameter is determined in the method for determining the first parameter in the embodiment of the second aspect, and reference may be made to the embodiment of the second aspect for a particular method for determination, contents of which being incorporated herein, and being not going to be described herein any further.

In some embodiments, in 903, the first parameter is determined according to the first factor and the second parameter. In the embodiment of the third aspect, a definition of the first parameter is identical to the definition of the first parameter in the embodiment of the second aspect, but their methods for determination are different.

For example, the first parameter is equal to a product of the second parameter and the first factor. That is, the first parameter=the second parameter scaled by the first factor.

For another example, the first parameter is equal to a value obtained by flooring a product of the second parameter and the first factor.

For a further example, the first parameter is equal to a quotient obtained by dividing the second parameter by the first factor.

For still another example, the first parameter is equal to a value obtained by flooring a quotient obtained by dividing the second parameter by the first factor.

In some embodiments, a value of the first factor is predefined, or is indicated by the network device. The value of the first factor is greater than 0, such as ½, ¼, 2, and 4, etc.

In some embodiments, the value M (the sign is not limited thereto) of the first factor is: $M=\frac{1}{2}^N$ or $M=2^N$, N (the sign is not limited thereto) being the number of the first bits.

Following description shall be given by taking that the first parameter is characterized by $k_{SSB}$ and the second parameter is characterized by $k'_{SSB}$ as an example.

For example, $k_{SSB}=\lfloor k'_{SSB}*M \rfloor$, or, $k_{SSB}=k'_{SSB}*M$, wherein, a value of $k'_{SSB}$ is determined in an existing method or in the method of the embodiment of the second aspect, and M is greater than 0, such as ½, and ¼, etc. In particular, $M=\frac{1}{2}^N$; where, N is predefined, or is indicated by the network device, for example, it is equal to the number of bits in $\bar{a}_{\bar{A}+5}$ and/or ssb-SubcarrierOffset used to indicate the QCL relationship between SSBs, more specifically, for example, it is equal to the number of bits in $\bar{a}_{\bar{A}+5}$ and/or ssb-SubcarrierOffset used to indicate the third parameter. For example, $\bar{a}_{\bar{A}+5}$ and/or N LSBs in ssb-SubcarrierOffset are used to indicate the third parameter; however, it is not limited thereto.

For example, $k_{SSB}=\lfloor k'_{SSB}/M \rfloor$, or, $k_{SSB}=k'_{SSB}/M$, wherein, a value of $k'_{SSB}$ is determined in the method for determining $k_{SSB}$ in Rel-15 NR or in the method of the embodiment of the second aspect, and M is greater than 0, such as 2, and 4, etc. In particular, $M=2^N$; where, N is predefined, or indicated by a base station, for example, it is equal to the number of bits in $\bar{a}_{\bar{A}+5}$ and/or ssb-SubcarrierOffset used to indicate the QCL relationship between SSBs, more specifically, for example, it is equal to the number of bits, used to indicate the third parameter, in $\bar{a}_{\bar{A}+5}$ and/or ssb-SubcarrierOffset. For example, $\bar{a}_{\bar{A}+5}$ and/or N LSBs in ssb-SubcarrierOffset are used to indicate the third parameter; however, it is not limited thereto.

Following description shall be given by taking $k_{SSB}=\lfloor k'_{SSB}*M \rfloor$ as an example.

Assuming that M=½ and the value of $k'_{SSB}$ is determined in the method for determining $k_{SSB}$ in Rel-15 NR, a correspondence relationship between the value of $k_{SSB}$, the bits in ssb-SubcarrierOffset and the value of $\bar{a}_{\bar{A}+5}$ is shown in a table below. In this way, when the LSB in ssb-SubcarrierOffset is used to indicate the third parameter, the value range of $k_{SSB}$ is not limited, for example, $k_{SSB}$ is not limited to including only odd numbers or only even numbers.

| $k_{SSB}$ | $k'_{SSB}$ | $\bar{a}_{\bar{A}+5}$ | ssb-SubcarrierOffset |
|---|---|---|---|
| 0 | 0 | 0 | 0000 |
| 0 | 1 | 0 | 0001 |
| 1 | 2 | 0 | 0010 |
| 1 | 3 | 0 | 0011 |
| 2 | 4 | 0 | 0100 |
| 2 | 5 | 0 | 0101 |
| 3 | 6 | 0 | 0110 |
| 3 | 7 | 0 | 0111 |
| 4 | 8 | 1 | 0000 |
| 4 | 9 | 1 | 0001 |
| 5 | 10 | 1 | 0010 |
| 5 | 11 | 1 | 0011 |
| 6 | 12 | 1 | 0100 |
| 6 | 13 | 1 | 0101 |
| 7 | 14 | 1 | 0110 |
| 7 | 15 | 1 | 0111 |
| 8 | 16 | 0 | 0000 |
| 8 | 17 | 0 | 0001 |
| 9 | 18 | 0 | 0010 |
| 9 | 19 | 0 | 0011 |
| 10 | 20 | 0 | 0100 |
| 10 | 21 | 0 | 0101 |
| 11 | 22 | 0 | 0110 |
| 11 | 23 | 0 | 0111 |
| 12 | 24 | 1 | 0000 |
| 12 | 25 | 1 | 0001 |
| 13 | 26 | 1 | 0010 |
| 13 | 27 | 1 | 0011 |
| 14 | 28 | 1 | 0100 |
| 14 | 29 | 1 | 0101 |
| 15 | 30 | 1 | 0110 |
| 15 | 31 | 1 | 0111 |

In the embodiment of this disclosure, in 904, the processing of the terminal equipment is identical to that in 703 in the embodiment of the second aspect, contents thereof being incorporated herein, which shall not be described herein any further.

In some embodiments, similar to 704 in the embodiment of the second aspect, the terminal equipment may further determine a type of the information indicated by the first bit; and similar to 705 in the embodiment of the second aspect, the terminal equipment may further determine whether to receive SIB1 according to whether the first synchronization signal block has associated SIB1 and/or a type of SIB1 associated with the first synchronization signal block. The contents of 704 and 705 in the embodiment of the second aspect are incorporated herein, and shall not be described herein any further.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 9.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that for an unlicensed or shared spectrum/band, indicating the QCL relationship between SSBs (such as indicating the third parameter) or other information by reusing the bits in the indication fields in the PBCH payload defined in Rel-15 NR is supported, while eliminating or avoiding effects on other necessary or important information as possible, so that the system may operate normally and efficiently.

EMBODIMENT OF A FOURTH ASPECT

The embodiment of this disclosure provides a system information reception apparatus. The apparatus may be, for example, a terminal equipment, or may be one or more components or assemblies configured in a terminal equipment, which are collectively referred to as being configured in a terminal equipment in the embodiment of this disclosure, for the sake of convenience of description. Contents in this embodiment identical to those in the embodiment of any one of first to third aspects shall not be described herein any further.

FIG. 10 is a schematic diagram of the system information reception apparatus of the embodiment of this disclosure. As shown in FIG. 10, the system information reception apparatus 1000 includes:

a first receiving unit 1001 configured to receive a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{A}+5}$ in a physical broadcast channel payload contained in the first synchronization signal block being used for indicating a QCL relationship between SSBs or being not used for indicating a first parameter;

a first determining unit 1002 configured to determine the first parameter according to the first synchronization signal block, the first parameter being used by a terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and a second receiving unit 1003 configured to receive the SIB1, associated with the first synchronization signal block, or a second synchronization signal block according to the first parameter.

In some embodiments, that the first determining unit 1002 determines the first parameter includes that the first determining unit 1002 determines the first parameter according to one of the following method:

assuming that a value of the first bit is 0 or 1;

assuming that a value of binary bits of the first parameter corresponding to the first bit is 0 or 1;

determining the first parameter according to only other bits than the first bit in ssb-SubcarrierOffset and/or $\bar{a}_{\bar{A}+5}$ in the physical broadcast channel payload contained in the first synchronization signal block; and determining the first parameter according to bits carried by the first synchronization signal block other than bits in ssb-SubcarrierOffset and/or $\bar{a}_{\bar{A}+5}$ in the physical broadcast channel payload contained in the first synchronization signal block.

In some embodiments, in a case where the first determining unit 1002 assumes that a value of the first bit is 0 or 1 or that a value of binary bits of the first parameter corresponding to the first bit is 0 or 1, that the first determining unit 1002 determines the first parameter further includes:

the first determining unit 1002 determines whether a value of the first bit is 0 or 1 according to information carried by the first synchronization signal block other than the first bit, or whether a value of binary bits of the first parameter corresponding to the first bit is 0 or 1 according to information carried by the first synchronization signal block other than the first bit.

In some embodiments, as shown in FIG. 10, the system information reception apparatus 1000 further includes:

a second determining unit 1004 configured to determine a type of information indicated by the first bit in $\bar{a}_{\bar{A}+5}$ and/or ssb-SubcarrierOffset in the physical broadcast channel payload contained in the first synchronization signal block before the first determining unit 1002 determines the first parameter.

In some embodiments, that the second receiving unit 1003 receives the SIB1 according to the first parameter includes:

the second receiving unit 1003 determines an offset between the first synchronization signal block and a common resource block (CRB) grid according to the first parameter and a reference subcarrier spacing, and receives the SIB1 associated with the first synchronization signal block according to the offset;

wherein the reference subcarrier spacing is a subcarrier spacing of the first synchronization signal block or the CORESET, or is a predefined subcarrier spacing.

In some embodiments, the second receiving unit 1003 further determines the offset between the first synchronization signal block and the common resource block (CRB) grid according to a second factor.

In some embodiments, the terminal equipment does not expect that the value of the first parameter is not within a range for determining a position of the CORESET.

FIG. 11 is another schematic diagram of the system information reception apparatus of the embodiment of this disclosure. As shown in FIG. 11, the system information reception apparatus 1100 includes:

a first receiving unit 1101 configured to receive a first synchronization signal block (SSB);

a first determining unit 1102 configured to determine a second parameter according to the first synchronization signal block;

a second determining unit 1103 configured to determine a first parameter according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and a second receiving unit 1104 configured to receive the SIB1, associated with the first synchronization signal block, or a second synchronization signal block according to the first parameter.

In some embodiments, the first parameter or the second parameter is characterized by $k_{SSB}$.

In some embodiments, that the first determining unit 1102 determines the second parameter includes the first determining unit 1102 determines the second parameter according to one of the following method:

assuming that a value of the first bit is 0 or 1;

assuming that a value of binary bits of the second parameter corresponding to the first bit is 0 or 1;

determining the second parameter according to only other bits than the first bit in ssb-SubcarrierOffset and/or $\bar{a}_{\bar{A}+5}$ in the physical broadcast channel payload contained in the first synchronization signal block; and determining the second parameter according to bits carried by the first synchronization signal block other than bits in ssb-SubcarrierOffset and/or $\bar{a}_{\bar{A}+5}$ in the physical broadcast channel payload contained in the first synchronization signal block.

In some embodiments, in a case where the first determining unit 1102 assumes that a value of the first bit is 0 or 1 or that a value of binary bits of the second parameter corresponding to the first bit is 0 or 1, that the first determining unit 1102 determines the second parameter further includes:

the first determining unit 1102 determines whether a value of the first bit is 0 or 1 according to information carried by the first synchronization signal block other than the first bit, or whether a value of binary bits of the second parameter corresponding to the first bit is 0 or 1 according to information carried by the first synchronization signal block other than the first bit.

In some embodiments, as shown in FIG. 11, the system information reception apparatus 1100 further includes:

a third determining unit 1105 configured to determine a type of information indicated by the first bit in $\bar{a}_{\bar{A}+5}$ and/or ssb-SubcarrierOffset in the physical broadcast channel payload contained in the first synchronization signal block before the first determining unit 1102 determines the second parameter.

In some embodiments, a value of the first factor is $M=\frac{1}{2}^N$, where, M is the first factor, and N is the number of the first bits in $\bar{a}_{\bar{A}+5}$ and/or ssb-SubcarrierOffset in a physical broadcast channel payload contained in the first synchronization signal block used for indicating a QCL relationship between SSBs or not used for indicating the first parameter.

In some embodiments, the first parameter is equal to a product of the second parameter and the first factor, or the first parameter is equal to a value obtained by flooring a product of the second parameter and the first factor.

In some embodiments, that the second receiving unit 1104 receives the SIB1 according to the first parameter includes:

the second receiving unit 1104 determines an offset between the first synchronization signal block and a common resource block (CRB) grid according to the first parameter and a reference sub carrier spacing, and receives the SIB1 according to the offset;

wherein the reference subcarrier spacing is a subcarrier spacing of the first synchronization signal block or the CORESET, or is a predefined subcarrier spacing.

In some embodiments, the second receiving unit 1104 further determines the offset between the first synchronization signal block and the common resource block (CRB) grid according to a second factor.

In some embodiments, the terminal equipment does not expect that the value of the first parameter is not within a range for determining a position of the CORESET.

FIG. 12 is a further schematic diagram of the system information reception apparatus of the embodiment of this disclosure. As shown in FIG. 12, the system information reception apparatus 1200 includes:

a receiving unit 1201 configured to receive a synchronization signal block (SSB) transmitted by a network device, at least one bit of at least one of the following indication fields in a physical broadcast channel payload contained in the synchronization signal block being used for indicating a QCL relationship between SSBs:

intraFreqReselection;

subCarrierSpacingCommon;

$\bar{a}_{\bar{A}+6}$;

pdcch-ConfigSIB1;

$\bar{a}_{\bar{A}+5}$ and ssb-SubcarrierOffset.

In some embodiments, the at least one indication field indicates the QCL relationship between SSBs by indicating a third parameter.

In some embodiments, in selecting or reselecting a cell, the terminal equipment assumes that intraFreqReselection is set to be notAllowed.

It should be noted that the components or modules related to this disclosure are only described above. However, this disclosure is not limited thereto, and the system information reception apparatus 1000/1100/1200 may further include other components or modules, and reference may be made to related techniques for particulars of these components or modules.

Furthermore, for the sake of simplicity, connection relationships between the components or modules or signal profiles thereof are only illustrated in FIG. 10, FIG. 11 and FIG. 12. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that for an unlicensed or shared spectrum/band, indicating the QCL relationship between SSBs (such as indicating the third parameter) or other information by reusing the bits in the indication fields in the PBCH payload defined in Rel-15 NR is supported, while eliminating or avoiding effects on other necessary or important information as possible, so that the system may operate normally and efficiently.

EMBODIMENT OF A FIFTH ASPECT

The embodiment of this disclosure provides a system information transmission method, which shall be described from a network device side. Problems to be solved by the embodiment of this disclosure may refer to the embodiments of the first to third aspects, with contents identical to those in the embodiments of the first to third aspects being not going to be described herein any further.

FIG. 13 is a schematic diagram of the system information transmission method of the embodiment of this disclosure. As shown in FIG. 13, the system information transmission method includes:

1301: a network device transmits a synchronization signal block to a terminal equipment, at least one bit of at least one of the following indication fields in a physical broadcast channel payload contained in the synchronization signal block being used for indicating a QCL relationship between SSBs:

intraFreqReselection;

subCarrierSpacingCommon;

$\bar{a}_{\bar{A}+6}$;

pdcch-ConfigSIB1;

$\bar{a}_{\bar{A}+5}$ and ssb-SubcarrierOffset.

In the embodiment of this disclosure, the network device may further transmit other information to the terminal equipment. Reference may be made to the contents related to the network device in embodiments of first to third aspects for details, which shall not be described herein any further.

It can be seen from the above embodiment that for an unlicensed or shared spectrum/band, indicating the QCL relationship between SSBs (such as indicating the third parameter) or other information by reusing the bits in the indication fields in the PBCH payload defined in Rel-15 NR is supported, while eliminating or avoiding effects on other necessary or important information as possible, so that the system may operate normally and efficiently.

EMBODIMENT OF A SIXTH ASPECT

The embodiment of this disclosure provides a system information transmission apparatus. The apparatus may be, for example, a network device, or may be one or more components or assemblies configured in a network device, which are collectively referred to as being configured in a network device in the embodiment of this disclosure, for the sake of convenience of description. Contents in this embodiment identical to those in the embodiment of the fifth aspect shall not be described herein any further.

FIG. 14 is a schematic diagram of the system information transmission apparatus of the embodiment of this disclosure. As shown in FIG. 14, the system information transmission apparatus 1400 includes:

a transmitting unit 1401 configured to transmit a synchronization signal block to a terminal equipment, at least one bit of at least one of the following indication fields in a physical broadcast channel payload contained in the synchronization signal block being used for indicating a QCL relationship between SSBs:

intraFreqReselection;

subCarrierSpacingCommon;

$\bar{a}_{\bar{A}+6}$;

pdcch-ConfigSIB1;

$\bar{a}_{\bar{A}+5}$ and ssb-SubcarrierOffset.

In the embodiment of this disclosure, the transmitting unit 1401 may further transmit other information to the terminal equipment. Reference may be made to the contents related the network device in embodiments of first to third aspects for details, which shall not be described herein any further.

It can be seen from the above embodiment that for an unlicensed or shared spectrum/band, indicating the QCL relationship between SSBs (such as indicating the third parameter) or other information by reusing the bits in the indication fields in the PBCH payload defined in Rel-15 NR is supported, while eliminating or avoiding effects on other necessary or important information as possible, so that the system may operate normally and efficiently.

EMBODIMENT OF A SEVENTH ASPECT

The embodiment of this disclosure provides a communication system, and reference may be made to FIG. 1, with contents identical to those in the embodiments of the first to the sixth aspects being not going to be described herein any further.

In some embodiments, the communication system 100 may include:

a terminal equipment 102 including the system information reception apparatus 1000/1100/1200 as described in the embodiment of the fourth aspect.

In some embodiments, the communication system 100 may include:

a terminal equipment 102 including the system information reception apparatus 1000/1100/1200 as described in the embodiment of the fourth aspect; and a network device 101 including the system information transmission apparatus 1400 as described in the embodiment of the sixth aspect.

The embodiment of this disclosure further provides a network device, which may be, for example, a base station. However, this disclosure is not limited thereto, and it may also be another network device.

FIG. 15 is a schematic diagram of the network device of the embodiment of this disclosure. As shown in FIG. 15, the network device 1500 may include a processor 1510 (such as a central processing unit (CPU)) and a memory 1520, the memory 1520 being coupled to the processor 1510. The memory 1520 may store various data, and furthermore, it may store a program 1530 for data processing, and execute the program 1530 under control of the processor 1510.

For example, the processor 1510 may be configured to execute a program to carry out the system information transmission method as described in the embodiment of the fifth aspect. For example, the processor 1510 may be configured to execute the following control: transmitting a synchronization signal block to a terminal equipment, at least one bit of at least one of the following indication fields in a physical broadcast channel payload contained in the synchronization signal block being used for indicating a QCL relationship between SSBs:

intraFreqReselection;

subCarrierSpacingCommon;

$\bar{a}_{\bar{A}+6}$;

pdcch-ConfigSIB1;

$\bar{a}_{\bar{A}+5}$ and ssb-SubcarrierOffset.

Furthermore, as shown in FIG. 15, the network device 1500 may include a transceiver 1540, and an antenna 1550, etc. Functions of the above components are similar to those in the related art, and shall not be described herein any further. It should be noted that the network device 1500 does not necessarily include all the parts shown in FIG. 15, and furthermore, the network device 1500 may include parts not shown in FIG. 15, and the related art may be referred to.

The embodiment of this disclosure further provides a terminal equipment; however, this disclosure is not limited thereto, and it may also be another equipment.

Figure 16:
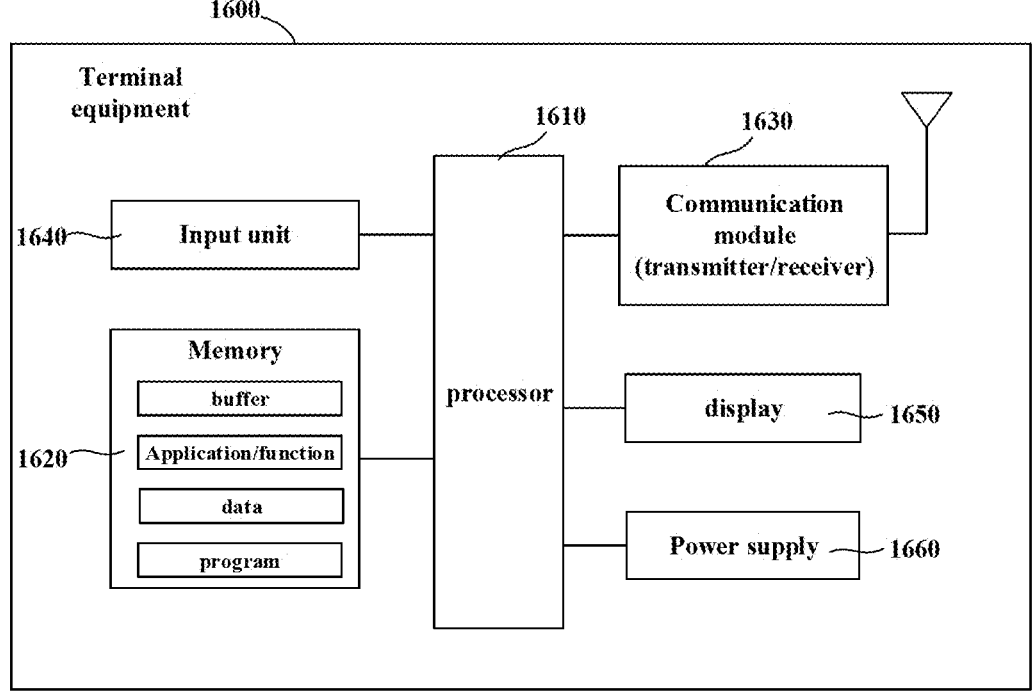
FIG. 16 is a schematic diagram of a terminal equipment of an embodiment of this disclosure.

FIG. 16 is a schematic diagram of the terminal equipment of the embodiment of this disclosure. As shown in FIG. 16, the terminal equipment 1600 may include a processor 1610 and a memory 1620, the memory 1620 storing data and a program and being coupled to the processor 1610. It should be noted that this figure is illustrative only, and other types of structures may also be used, so as to supplement or replace this structure and achieve a telecommunications function or other functions.

For example, the processor 1610 may be configured to execute a program to carry out the method as described in the embodiment of the first aspect. For example, the processor 1610 may be configured to perform the following control: receiving a synchronization signal block (SSB) transmitted by a network device, at least one bit of at least one of the following indication fields in a physical broadcast channel payload contained in the synchronization signal block being used for indicating a QCL relationship between SSBs: intraFreqReselection; subCarrierSpacingCommon; $\bar{a}$ $\bar{a}_{+6}$; pdcch-ConfigSIB1; $\bar{a}_{\bar{A}+5}$ and ssb-SubcarrierOffset.

For another example, the processor 1610 may be configured to execute a program to carry out the method as described in the embodiment of the second aspect. For example, the processor 1610 may be configured to perform the following control: receiving a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{A}+5}$ in a physical broadcast channel payload contained in the first synchronization signal block being used for indicating a QCL relationship between SSBs or being not used for indicating a first parameter; determining the first parameter according to the first synchronization signal block, the first parameter being used by a terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; receiving the SIB1, associated with the first synchronization signal block, or a second synchronization signal block according to the first parameter.

For a further example, the processor 1610 may be configured to execute a program to carry out the method as described in the embodiment of the third aspect. For example, the processor 1610 may be configured to perform the following control: receiving a first synchronization signal block (SSB) transmitted by a network device; determining a second parameter according to the first synchronization signal block; determining a first parameter according to a first factor and the second parameter, the first parameter being used by a terminal equipment to determine a position of a CORESET used for monitoring or receiving PDCCHs, the PDCCHs being used for scheduling PDSCHs carrying SIB1 associated with the first synchronization signal block, or the first parameter being used by a terminal equipment to determine that the first synchronization signal block has no associated SIB1; receiving SIB1, associated with the first synchronization signal block, or a second synchronization signal block according to the first parameter.

As shown in FIG. 16, the terminal equipment 1600 may further include a communication module 1630, an input unit 1640, a display 1650, and a power supply 1660, wherein functions of the above components are similar to those in the related art, which shall not be described herein any further. It should be noted that the terminal equipment 1600 does not necessarily include all the parts shown in FIG. 16, and the above components are not necessary. Furthermore, the terminal equipment 1600 may include parts not shown in FIG. 16, and the related art may be referred to.

An embodiment of this disclosure provides a computer readable program, which, when executed in a terminal equipment, will cause the terminal equipment to carry out the system information reception method as described in the embodiments of the first to the third aspects.

An embodiment of this disclosure provides a storage medium storing a computer readable program, which will cause a terminal equipment to carry out the system information reception method as described in the embodiments of the first to the third aspects.

An embodiment of this disclosure provides a computer readable program, which, when executed in a network device, will cause the network device to carry out the system information transmission method as described in the embodiment of the fifth aspect.

An embodiment of this disclosure provides a storage medium, storing a computer readable program, which will cause a network device to carry out the system information transmission method as described in the embodiment of the fifth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A system information reception method, wherein the method includes:

receiving, by a terminal equipment, a synchronization signal block (SSB) transmitted by a network device, at least one bit of at least one of the following indication fields in a physical broadcast channel payload contained in the synchronization signal block being used for indicating a QCL relationship between SSBs:

intraFreqReselection;

subCarrierSpacingCommon;

$\overline{a}_{\overline{A}+6}$;

pdcch-ConfigSIB1;

$\overline{a}_{\overline{A}+5}$ and ssb-SubcarrierOffset.

Supplement 2. The method according to supplement 1, wherein the at least one bit indicates the QCL relationship between SSBs by indicating a third parameter.

Supplement 3. The method according to supplement 2, wherein the third parameter is characterized by Q, or is characterized by $$N_{SSB}^{QCL}.$$

Supplement 4. The method according to supplement 1, wherein in selecting or reselecting a cell, the terminal equipment assumes that intraFreqReselection is set to be notAllowed.

Supplement 5. The method according to supplement 2, wherein the method further includes: determining by the terminal equipment whether the physical broadcast channel included in the synchronization signal block indicates the third parameter and/or the value range of the third parameter according to at least one of the following:

whether the synchronization signal block has associated SIB1;

a frequency-domain position of the synchronization signal block; and information carried by the synchronization signal block.

Supplement 6. The method according to supplement 5, wherein the terminal equipment determines whether the synchronization signal block has associated SIB1 according to at least one of the following:

a frequency-domain position of the synchronization signal block; and information carried by the synchronization signal block.

Supplement 7. The method according to supplement 6, wherein that the terminal equipment determines whether the synchronization signal block has associated SIB1 according to the frequency-domain position of the synchronization signal block includes that:

if the synchronization signal block is at an unlicensed spectrum/band or a shared spectrum/band, the terminal equipment always assumes that the synchronization signal block has associated SIB1; or if the synchronization signal block is not on a sync raster defined in NR-U, the synchronization signal block has no associated SIB1, and if the synchronization signal block is on the sync raster defined in NR-U, the synchronization signal block has associated SIB1; or if the synchronization signal block is not on a sync raster defined in Rel-15 NR, the synchronization signal block has no associated SIB1, and if the synchronization signal block is on the sync raster defined in Rel-15 NR, the synchronization signal block has associated SIB1.

Supplement 8. The method according to supplement 6, wherein that the terminal equipment determines whether the synchronization signal block has associated SIB1 according to the information carried by the synchronization signal block includes at least one of the following that:

the terminal equipment determines whether the synchronization signal block has associated SIB1 according to a value of $k_{SSB}$ indicated by the synchronization signal block;

the terminal equipment determines whether the synchronization signal block has associated SIB1 according to an MSB in ssb-SubcarrierOffset and $\overline{a}_{\overline{A}+5}$ in a payload of a physical broadcast channel included in the synchronization signal block; and the terminal equipment determines whether the synchronization signal block has associated SIB1 according to at least one of the following indication fields of the physical broadcast channel included in the synchronization signal block:

intraFreqReselection;

subCarrierSpacingCommon;

$\overline{a}_{\overline{A}+6}$; and pdcch-ConfigSIB1.

Supplement 9. The method according to supplement 5, wherein that the terminal equipment determines whether the physical broadcast channel included in the synchronization signal block indicates the third parameter according to whether the synchronization signal block has associated SIB1 includes:

if the synchronization signal block has no associated SIB1, it is determined that the physical broadcast channel included in the synchronization signal block does not indicate the third parameter; and if the synchronization signal block has associated SIB1, it is determined that the physical broadcast channel included in the synchronization signal block indicates the third parameter.

Supplement 10. The method according to supplement 5, wherein that the terminal equipment determines whether the physical broadcast channel included in the synchronization signal block indicates the third parameter according to the frequency-domain position of the synchronization signal block includes:

if the synchronization signal block is not on the sync raster defined in NR-U, it is determined that the physical broadcast channel included in the synchronization signal block does not indicate the third parameter, and if the synchronization signal block is on the sync raster defined in NR-U, it is determined that the physical broadcast channel included in the synchronization signal block indicates the third parameter; or if the synchronization signal block is not on the sync raster defined in Rel-15 NR, it is determined that the physical broadcast channel included in the synchronization signal block does not indicate the third parameter, and if the synchronization signal block is on the sync raster defined in Rel-15 NR, it is determined that the physical broadcast channel included in the synchronization signal block indicates the third parameter.

Supplement 11. The method according to supplement 5, wherein that the terminal equipment determines the value range of the third parameter according to whether the synchronization signal block has associated SIB1 includes:

if the synchronization signal block has no associated SIB1, it is determined that the value range of the third parameter is a first range; and if the synchronization signal block has associated SIB1, it is determined that the value range of the third parameter is a second range.

Supplement 12. The method according to supplement 5, wherein that the terminal equipment determines the value range of the third parameter according to the frequency-domain position of the synchronization signal block includes:

if the synchronization signal block is not on the sync raster defined in NR-U, it is determined that the value range of the third parameter is a first range, and if the synchronization signal block is on the sync raster defined in NR-U, it is determined that the value range of the third parameter is a second range; or if the synchronization signal block is not on the sync raster defined in Rel-15 NR, it is determined that the value range of the third parameter is a first range, and if the synchronization signal block is on the sync raster defined in Rel-15 NR, it is determined that the value range of the third parameter is a second range.

Supplement 13. The method according to supplement 5, wherein the information carried by the physical broadcast channel included in the synchronization signal block refers to information other than information in the at least one indication field of the physical broadcast channel included in the synchronization signal block that is possibly used to indicate the third parameter.

Supplement 14. The method according to supplement 5, wherein in a case where the terminal equipment determines the value range of the third parameter, the method further includes:

determining an indication field for indicating the third parameter by the terminal equipment according the value range of the third parameter.

Supplement 15. The method according to supplement 14, wherein, if the value range of the third parameter is a first range, the terminal equipment determines that the indication field used to indicate the third parameter is subCarrierSpacingCommon or intraFreqReselection; and if the value range of the third parameter is a second range, the terminal equipment determines that the indication field used to indicate the third parameter is subCarrierSpacingCommon and intraFreqReselection.

Supplement 16. A system information reception method, wherein the method includes:

receiving, by a terminal equipment, a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{A}+5}$ in a physical broadcast channel payload contained in the first synchronization signal block being used for indicating a QCL relationship between SSBs or being not used for indicating a first parameter;

determining the first parameter by the terminal equipment according to the first synchronization signal block, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and receiving the SIB1, associated with the first synchronization signal block, or a second synchronization signal block by the terminal equipment according to the first parameter.

Supplement 16.1. The method according to supplement 16, wherein the first bit is LSB in ssb-SubcarrierOffset.

Supplement 17. The method according to supplement 16, wherein the first parameter is characterized by $k_{SSB}$.

Supplement 18. The method according to supplement 16, wherein the determining the first parameter includes determining the first parameter by the terminal equipment according to one of the following methods:

assuming that a value of the first bit is 0 or 1;

assuming that a value of binary bits of the first parameter corresponding to the first bit is 0 or 1;

determining the first parameter according to only other bits than the first bit in ssb-SubcarrierOffset and/or $\bar{a}_{\bar{A}+5}$ in the physical broadcast channel payload contained in the first synchronization signal block; and determining the first parameter according to bits carried by the first synchronization signal block other than bits in ssb-SubcarrierOffset and/or $\bar{a}_{\bar{A}+5}$ in the physical broadcast channel payload contained in the first synchronization signal block.

Supplement 19. The method according to supplement 18, wherein in a case where the terminal equipment assumes that a value of the first bit is 0 or 1 or that a value of binary bits of the first parameter corresponding to the first bit is 0 or 1, the determining the first parameter further includes:

determining by the terminal equipment whether a value of the first bit is 0 or 1 according to information carried by the first synchronization signal block other than the first bit, or whether a value of binary bits of the first parameter corresponding to the first bit is 0 or 1 according to information carried by the first synchronization signal block other than the first bit.

Supplement 20. The method according to supplement 18, wherein before determining the first parameter, the method further includes:

determining a type of information indicated by the first bit in $\bar{a}_{\bar{A}+5}$ and/or ssb-SubcarrierOffset in the physical broadcast channel payload contained in the first synchronization signal block by the terminal equipment.

Supplement 21. The method according to supplement 20, wherein the determining the type of information indicated by the first bit includes:

determining the type of information indicated by the first bit by the terminal equipment according to bits other than the first bit carried by the first synchronization signal block; or determining the type of information indicated by the first bit by the terminal equipment according to whether the first synchronization signal block has associated SIB1.

Supplement 22. The method according to supplement 16, wherein that the terminal equipment receives the SIB1 according to the first parameter includes:

determining an offset between the first synchronization signal block and a common resource block (CRB) grid by the terminal equipment according to the first parameter and a reference subcarrier spacing, wherein the reference subcarrier spacing is a subcarrier spacing of the first synchronization signal block or the CORESET, or is a predefined subcarrier spacing; and receiving the SIB1 associated with the first synchronization signal block by the terminal equipment according to the offset.

Supplement 23. The method according to supplement 22, wherein the terminal equipment further determines the offset between the first synchronization signal block and the common resource block (CRB) grid according to a second factor.

Supplement 24. The method according to supplement 22, wherein the offset is equal to a product of the first parameter and a granularity indicated by the first parameter, the granularity indicated by the first parameter being equal to the reference subcarrier spacing, or the granularity indicated by the first parameter being equal to a product of the reference subcarrier spacing and a second factor.

Supplement 25. The method according to any one of supplements 22-24, wherein the terminal equipment does not expect that the value of the first parameter is not within a range for determining a position of the CORESET.

Supplement 26. The method according to supplement 16, wherein before receiving SIB1, the method further includes:

determining by the terminal equipment whether to receive SIB1 according to whether the first synchronization signal block has associated SIB1 and/or a type of SIB1 associated with the first synchronization signal block.

Supplement 27. The method according to supplement 26, wherein the terminal equipment determines whether the first synchronization signal block has associated SIB1 and/or a type of SIB1 associated with the first synchronization block according to at least one of following:

a frequency-domain position of the first synchronization signal block; and information carried by the first synchronization signal block.

Supplement 28. The method according to supplement 27, wherein that the terminal equipment determines whether the first synchronization signal block has associated SIB1 and/or a type of SIB1 associated with the first synchronization block according to the frequency-domain position of the first synchronization signal block includes that:

if the first synchronization signal block is at an unlicensed spectrum/band or a shared spectrum/band, the terminal equipment always assumes that the first synchronization signal block has associated SIB1, and determines the type of SIB1 associated with the first synchronization signal block according to whether the first synchronization signal block is on the sync raster defined in NR-U; or if the first synchronization signal block is not on the sync raster defined in NR-U, the first synchronization signal block has no associated SIB1; and if the first synchronization signal block is on the sync raster defined in NR-U, the first synchronization signal block has associated SIB1; or if the first synchronization signal block is not on the sync raster defined in Rel-15 NR, the first synchronization signal block has no associated SIB1; and if the first synchronization signal block is on the sync raster defined in Rel-15 NR, the first synchronization signal block has associated SIB1.

Supplement 29. The method according to supplement 27, wherein that the terminal equipment determines whether the first synchronization signal block has associated SIB1 and/or a type of SIB1 associated with the first synchronization block according to the information carried by the first synchronization signal block includes at least one of the following that:

the terminal equipment determines whether the first synchronization signal block has associated SIB1 and/or the type of the SIB1 associated with the first synchronization signal block according to the first parameter;

the terminal equipment determines whether the first synchronization signal block has associated SIB1 and/or the type of SIB1 associated with the first synchronization signal block according to the MSB in ssb-SubcarrierOffset and $\bar{a}_{\bar{A}+5}$ in the payload of the physical broadcast channel included in the first synchronization signal block; and the terminal equipment determines whether the first synchronization signal block has associated SIB1 and/or the type SIB1 associated with the first synchronization signal block according to at least one of the following indication fields of the physical broadcast channel included in the first synchronization signal block:

intraFreqReselection;

subCarrierSpacingCommon;

$\bar{a}_{\bar{A}+6}$;

pdcch-ConfigSIB1.

Supplement 30. The method according to any one of supplements 26-29, wherein in a case where the first synchronization signal block has no associated SIB1, the terminal equipment does not receive the SIB1, and the method further includes:

determining a frequency-domain position where a second synchronization block associated with SIB1 is located or a frequency range of the first synchronization signal block not associated with SIB1 by the terminal equipment according to the sync raster defined in NR-U.

Supplement 31. The method according to any one of supplements 26-29, wherein in a case where the first synchronization signal block has associated SIB1, the terminal equipment determines whether to receive the SIB1 according to at least one of the following that:

for cell selection or cell reselection, if the type of SIB1 associated with the first synchronization signal block is of a first type, the terminal equipment does not receive SIB1 associated with the first synchronization signal block; and for cell global identifier (CGI) report, the terminal equipment receives SIB1 associated with the first synchronization signal block.

Supplement 32. A system information reception method, wherein the method includes:

receiving, by a terminal equipment, a first synchronization signal block (SSB) transmitted by a network device;

determining a second parameter by the terminal equipment according to the first synchronization signal block;

determining a first parameter by the terminal equipment according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1; and receiving SIB1, associated with the first synchronization signal block, or a second synchronization signal block by the terminal equipment according to the first parameter.

Supplement 32.1. The method according to supplement 32, wherein the first synchronization signal block is transmitted on an unlicensed or shared spectrum/band, and/or a first bit in ssb-SubcarrierOffset and/or $\overline{a}_{\overline{A}+5}$ in a physical broadcast channel payload contained in the first synchronization signal block is used for indicating a QCL relationship between SSBs or is not used for indicating the second parameter.

Supplement 32.2. The method according to supplement 32.1, wherein the first bit is LSB in ssb-SubcarrierOffset.

Supplement 33. The method according to supplement 32, wherein the first parameter or the second parameter is characterized by $k_{SSB}$.

Supplement 34. The method according to supplement 32.1, wherein the determining the second parameter includes: determining the second parameter by the terminal equipment according to one of the following methods:

assuming that a value of the first bit is 0 or 1;

assuming that a value of binary bits of the first parameter corresponding to the first bit is 0 or 1;

determining the second parameter according to only other bits than the first bit in ssb-SubcarrierOffset and/or $\overline{a}_{\overline{A}+5}$ in the physical broadcast channel payload contained in the first synchronization signal block; and determining the second parameter according to bits carried by the first synchronization signal block other than bits in ssb-SubcarrierOffset and/or $\overline{a}_{\overline{A}+5}$ in the physical broadcast channel payload contained in the first synchronization signal block.

Supplement 35. The method according to supplement 34, wherein in a case where the terminal equipment assumes that a value of the first bit is 0 or 1 or that a value of binary bits of the second parameter corresponding to the first bit is 0 or 1, the determining the second parameter further includes:

determining by the terminal equipment whether a value of the first bit is 0 or 1 according to information carried by the first synchronization signal block other than the first bit, or whether a value of binary bits of the second parameter corresponding to the first bit is 0 or 1 according to information carried by the first synchronization signal block other than the first bit.

Supplement 36. The method according to supplement 34, wherein before determining the second parameter, the method further includes:

determining a type of information indicated by the first bit in $\overline{a}_{\overline{A}+5}$ and/or ssb-SubcarrierOffset in the physical broadcast channel payload contained in the first synchronization signal by the terminal equipment.

Supplement 37. The method according to supplement 36, wherein the determining a type of information indicated by the first bit includes:

determining a type of information indicated by the first bit by the terminal equipment according to bits carried by the first synchronization signal block other than the first bit; or determining a type of information indicated by the first bit by the terminal equipment according to whether the first synchronization signal block has associated SIB1.

Supplement 38. The method according to supplement 32.1, wherein a value of the first factor is $\frac{1}{2}^N$ or $2^N$, N being the number of the first bits.

Supplement 39. The method according to supplement 32, wherein the first parameter is equal to a product of the second parameter and the first factor, or the first parameter is equal to a value obtained by flooring a product of the second parameter and the first factor, or the first parameter is equal to a quotient obtained by dividing the second parameter by the first factor, or the first parameter is equal to a value obtained by flooring a quotient obtained by dividing the second parameter by the first factor.

Supplement 40. The method according to supplement 32, wherein that the terminal equipment receives SIB1 according to the first parameter includes:

determining an offset between the first synchronization signal block and a common resource block (CRB) grid by the terminal equipment according to the first parameter and a reference subcarrier spacing, wherein the reference subcarrier spacing is a subcarrier spacing of the first synchronization signal block or the CORESET, or is a predefined subcarrier spacing; and receiving the SIB1 by the terminal equipment according to the offset.

Supplement 41. The method according to supplement 40, wherein the terminal equipment further determines the offset between the first synchronization signal block and the common resource block (CRB) grid according to the first parameter and a second factor.

Supplement 42. The method according to supplement 40, wherein the offset is equal to a product of the first parameter and a granularity indicated by the first parameter, the granularity indicated by the first parameter being equal to a reference subcarrier spacing, or the granularity indicated by the first parameter being equal to a product of a reference subcarrier spacing and a second factor.

Supplement 43. The method according to any one of supplements 40-42, wherein the terminal equipment does not expect that the value of the first parameter is not within a range for determining a position of the CORESET.

Supplement 44. The method according to supplement 32, wherein before receiving SIB1, the method further includes:

determining by the terminal equipment whether to receive the SIB1 according to whether the first synchronization signal block has associated SIB1 and/or a type of SIB1 associated with the first synchronization signal block.

Supplement 45. The method according to supplement 44, wherein the terminal equipment determines whether the synchronization signal block has associated SIB1 and/or a type of SIB1 associated with the first synchronization signal block according to at least one of the following:

a frequency-domain position of the first synchronization signal block; and information carried by the first synchronization signal block.

Supplement 46. The method according to supplement 45, wherein that the terminal equipment determines whether the synchronization signal block has associated SIB1 and/or a type of SIB1 associated with the first synchronization signal block according to the frequency-domain position of the first synchronization signal block includes that:

if the first synchronization signal block is at an unlicensed spectrum/band or a shared spectrum/band, the terminal equipment always assumes that the first synchronization signal block has associated SIB1, and determines the type of SIB1 associated with the first synchronization signal block according to whether the first synchronization signal block is on the sync raster defined in NR-U; or if the first synchronization signal block is not on a sync raster defined in NR-U, the first synchronization signal block has no associated SIB1, and if the first synchronization signal block is on the sync raster defined in NR-U, the first synchronization signal block has associated SIB1; or if the first synchronization signal block is not on a sync raster defined in Rel-15 NR, the first synchronization signal block has no associated SIB1, and if the first synchronization signal block is on the sync raster defined in Rel-15 NR, the first synchronization signal block has associated SIB1.

Supplement 47. The method according to supplement 45, wherein that the terminal equipment determines whether the first synchronization signal block has associated SIB1 and/or a type of SIB1 associated with the first synchronization block according to the information carried by the first synchronization signal block includes at least one of the following that:

the terminal equipment determines whether the first synchronization signal block has associated SIB1 and/or the type of the SIB1 associated with the first synchronization signal block according to the first parameter;

the terminal equipment determines whether the first synchronization signal block has associated SIB1 and/or the type of SIB1 associated with the first synchronization signal block according to the MSB in ssb-SubcarrierOffset and $\bar{a}_{\bar{A}+5}$ in the payload of the physical broadcast channel included in the first synchronization signal block; and the terminal equipment determines whether the first synchronization signal block has associated SIB1 and/or the type SIB1 associated with the first synchronization signal block according to at least one of the following indication fields of the physical broadcast channel included in the first synchronization signal block:

intraFreqReselection;
subCarrierSpacingCommon;
$\bar{a}_{\bar{A}+6}$;
pdcch-ConfigSIB1.

Supplement 48. The method according to any one of supplements 44-47, wherein in a case where the first synchronization signal block has no associated SIB1, the terminal equipment does not receive the SIB1, and the method further includes:

determining a frequency-domain position where a second synchronization block associated with SIB1 is located or a frequency range of the first synchronization signal block not associated with SIB1 by the terminal equipment according to the sync raster defined in NR-U.

Supplement 49. The method according to any one of supplements 44-47, wherein in a case where the first synchronization signal block has no associated SIB1, the terminal equipment determines whether to receive SIB1 according to at least one of the following that:

for cell selection or cell reselection, if the type of SIB1 associated with the first synchronization signal block is of a first type, the terminal equipment does not receive SIB1 associated with the first synchronization signal block; and for cell global identifier (CGI) report, the terminal equipment receives SIB1 associated with the first synchronization signal block.

Supplement 50. A system information transmission method, wherein the method includes:

transmitting a synchronization signal block by a network device to a terminal equipment, at least one bit of at least one of the following indication fields in a physical broadcast channel payload contained in the synchronization signal block being used for indicating a QCL relationship between SSBs:

intraFreqReselection;
subCarrierSpacingCommon;
$\bar{a}_{\bar{A}+6}$;
pdcch-ConfigSIB1;
$\bar{a}_{\bar{A}+5}$ and ssb-SubcarrierOffset.

Supplement 51. A terminal equipment, including a memory and a processor, the memory storing a computer program, and the processor being configured to execute the computer program to carry out the method as described in any one of supplements 1-49.

Supplement 52. A network device, including a memory and a processor, the memory storing a computer program, and the processor being configured to execute the computer program to carry out the method as described in supplement 50.

Supplement 53. A communication system, including the terminal equipment as described in supplement 51 and the network device as described in supplement 52.

What is claimed is:

1. A system information reception apparatus, configured in a terminal equipment, wherein the apparatus comprises:

a receiver configured to receive a first synchronization signal block (SSB) transmitted by a network device, the first synchronization signal block being transmitted on an unlicensed or shared spectrum/band, and/or a first bit in ssb-SubcarrierOffset and/or $\bar{a}_{\bar{A}+5}$ in a physical broadcast channel payload contained in the first synchronization signal block being used for indicating a QCL relationship between SSBs or being not used for indicating a first parameter; and processor circuitry configured to determine the first parameter according to the first synchronization signal block, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1;

the receiver is further configured to receive the SIB1, associated with the first synchronization signal block, or a second synchronization signal block according to the first parameter.

2. The apparatus according to claim 1, wherein the first bit is LSB in ssb-SubcarrierOffset.

3. The apparatus according to claim 1, wherein that the processor circuitry determines the first parameter comprises that the processor circuitry determines the first parameter according to one of the following methods:

assuming that a value of the first bit is 0 or 1;
assuming that a value of binary bits of the first parameter corresponding to the first bit is 0 or 1;
determining the first parameter according to only other bits than the first bit in ssb-SubcarrierOffset and/or $\bar{a}_{\bar{A}+5}$ in the physical broadcast channel payload contained in the first synchronization signal block; and
determining the first parameter according to information carried by the first synchronization signal block other than bits in ssb-SubcarrierOffset and/or $\bar{a}_{\bar{A}+5}$ in the physical broadcast channel payload contained in the first synchronization signal block.

4. The apparatus according to claim 3, wherein in a case where the processor circuitry assumes that a value of the first bit is 0 or 1 or that a value of binary bits of the first parameter corresponding to the first bit is 0 or 1, that the processor circuitry determines the first parameter further comprises:

the processor circuitry determines whether a value of the first bit is 0 or 1 according to information carried by the first synchronization signal block other than the first bit, or whether a value of binary bits of the first parameter corresponding to the first bit is 0 or 1 according to information carried by the first synchronization signal block other than the first bit.

5. The apparatus according to claim 1, wherein:

the processor circuitry is further configured to determine a type of information indicated by the first bit in $\overline{a}_{\bar{A}+5}$ and/or ssb-SubcarrierOffset in the physical broadcast channel payload contained in the first synchronization signal block before the processor circuitry determines the first parameter.

6. The apparatus according to claim 1, wherein that the receiver receives the SIB1 according to the first parameter comprises:

the receiver determines an offset between the first synchronization signal block and a common resource block (CRB) grid according to the first parameter and a reference subcarrier spacing, and receives the SIB1 associated with the first synchronization signal block according to the offset;

wherein the reference subcarrier spacing is a subcarrier spacing of the first synchronization signal block or the CORESET, or is a predefined subcarrier spacing.

7. The apparatus according to claim 6, wherein the receiver further determines the offset between the first synchronization signal block and the common resource block (CRB) grid according to a second factor.

8. A system information reception apparatus, configured in a terminal equipment, wherein the apparatus comprises:

a receiver configured to receive a first synchronization signal block (SSB) transmitted by a network device; and processor circuitry configured to determine a second parameter according to the first synchronization signal block; and determine a first parameter according to a first factor and the second parameter, the first parameter being used by the terminal equipment to determine a position of a CORESET used for monitoring or receiving PDCCHs, the PDCCHs being used for scheduling PDSCHs carrying SIB1 associated with the first synchronization signal block, or the first parameter being used by the terminal equipment to determine that the first synchronization signal block has no associated SIB1;

the receiver is further configured to receive the SIB1, associated with the first synchronization signal block, or a second synchronization signal block according to the first parameter.

9. The apparatus according to claim 8, wherein the first parameter or the second parameter is characterized by $k_{SSB}$.

10. The apparatus according to claim 8, wherein the first synchronization signal block is transmitted on an unlicensed or shared spectrum/band, and/or a first bit in ssb-SubcarrierOffset and/or $\overline{a}_{\bar{A}+5}$ in a physical broadcast channel payload contained in the first synchronization signal block is used for indicating a QCL relationship between SSBs or is not used for indicating the second parameter.

11. The apparatus according to claim 10, wherein the first bit is LSB in ssb-SubcarrierOffset.

12. The apparatus according to claim 10, wherein that the processor circuitry determines the second parameter comprises that the processor circuitry determines the second parameter according to one of the following:

assuming that a value of the first bit is 0 or 1;

assuming that a value of binary bits of the second parameter corresponding to the first bit is 0 or 1;

determining the second parameter according to only other bits than the first bit in ssb-SubcarrierOffset and/or $\overline{a}_{\bar{A}+5}$ in the physical broadcast channel payload contained in the first synchronization signal block; and determining the second parameter according to information carried by the first synchronization signal block other than bits in ssb-SubcarrierOffset and/or $\overline{a}_{\bar{A}+5}$ in the physical broadcast channel payload contained in the first synchronization signal block.

13. The apparatus according to claim 12, wherein in a case where the processor circuitry assumes that a value of the first bit is 0 or 1 or that a value of binary bits of the second parameter corresponding to the first bit is 0 or 1, that the processor circuitry determines the second parameter further comprises:

the processor circuitry determines whether a value of the first bit is 0 or 1 according to information carried by the first synchronization signal block other than the first bit, or whether a value of binary bits of the second parameter corresponding to the first bit is 0 or 1 according to information carried by the first synchronization signal block other than the first bit.

14. The apparatus according to claim 12, wherein:

the processor circuitry is further configured to determine a type of information indicated by the first bit in $\overline{a}_{\bar{A}+5}$ and/or ssb-SubcarrierOffset in the physical broadcast channel payload contained in the first synchronization signal block before the processor circuitry determines the second parameter.

15. The apparatus according to claim 8, wherein a value of the first factor is $\frac{1}{2}^{N}$ or $2^{N}$, N being the number of the first bits.

16. The apparatus according to claim 8, wherein the first parameter is equal to a product of the second parameter and the first factor, or the first parameter is equal to a value obtained by flooring a product of the second parameter and the first factor, or the first parameter is equal to a quotient obtained by dividing the second parameter by the first factor, or the first parameter is equal to a value obtained by flooring a quotient obtained by dividing the second parameter by the first factor.

17. The apparatus according to claim 8, wherein that the receiver receives the SIB1 according to the first parameter comprises:

the receiver determines an offset between the first synchronization signal block and a common resource block (CRB) grid according to the first parameter and a reference subcarrier spacing, and receives the SIB1 according to the offset;

wherein the reference subcarrier spacing is a subcarrier spacing of the first synchronization signal block or the CORESET, or is a predefined subcarrier spacing.

18. The apparatus according to claim 17, wherein the receiver further determines the offset between the first synchronization signal block and the common resource block (CRB) grid according to a second factor.

19. A system information reception apparatus, configured in a terminal equipment, wherein the apparatus comprises:

a receiver configured to receive a synchronization signal block (SSB) transmitted by a network device, at least one bit of at least one of the following indication fields in a physical broadcast channel payload contained in the synchronization signal block being used for indicating a QCL relationship between SSBs:

intraFreqReselection;

subCarrierSpacingCommon;

$\bar{a}_{\overline{A}+6}$ ;

pdcch-ConfigSIB1;

$\bar{a}_{\overline{A}+5}$ and ssb-SubcarrierOffset.

20. The apparatus according to claim 19, wherein in selecting or reselecting a cell, the receiver assumes that intraFreqReselection is set to be notAllowed.

* * * * *